(12) United States Patent
Healy

(10) Patent No.: US 12,223,464 B2
(45) Date of Patent: *Feb. 11, 2025

(54) CUSTOMIZED INTEGRATED PRICING PACKAGES FOR FREIGHT SHIPMENT

(71) Applicant: Banyan Technology, Westlake, OH (US)

(72) Inventor: Lance Healy, Lakewood, OH (US)

(73) Assignee: Banyan Technology, Westlake, OH (US)

( * ) Notice: Subject to any disclaimer, the term of this patent is extended or adjusted under 35 U.S.C. 154(b) by 543 days.

This patent is subject to a terminal disclaimer.

(21) Appl. No.: 17/410,500

(22) Filed: Aug. 24, 2021

(65) Prior Publication Data

US 2021/0383324 A1 Dec. 9, 2021

Related U.S. Application Data

(63) Continuation-in-part of application No. 16/216,487, filed on Dec. 11, 2018, now Pat. No. 11,100,452.

(Continued)

(51) Int. Cl.
*G06Q 10/0834* (2023.01)
*G06Q 10/083* (2023.01)
*G06Q 30/0283* (2023.01)

(52) U.S. Cl.
CPC ... *G06Q 10/08345* (2013.01); *G06Q 10/0838* (2013.01); *G06Q 30/0283* (2013.01)

(58) Field of Classification Search
CPC ......... G06Q 10/08345; G06Q 10/0838; G06Q 30/0283

See application file for complete search history.

(56) References Cited

U.S. PATENT DOCUMENTS

| 5,880,958 A | 3/1999 | Helms et al. |
| 6,625,584 B1 | 9/2003 | Bains et al. |

(Continued)

FOREIGN PATENT DOCUMENTS

WO 0111523 A1 2/2001

OTHER PUBLICATIONS

Kellar, Gregory M., Cost Allocation Pricing (CAP) in the Motor Carrier Industry, The University of Tennessee, Knoxville, Aug. 1996.*

(Continued)

*Primary Examiner* — Nathan Erb
(74) *Attorney, Agent, or Firm* — Taft Stettinius & Hollister LLP

(57) ABSTRACT

Systems and methods include generating an integrated pricing package that incorporates attributes associated with a freight shipment that are updated and analyzed in real-time. Embodiments of the present disclosure relate to updating in real-time carrier attributes associated with a carrier. The carrier attributes are associated with each different transportation platform provided by the carrier and fluctuate depending on an availability of each different transportation platform. The carrier attributes are also analyzed in real-time to determine which carrier attributes apply to each freight shipment. The customized pricing parameters for each freight shipment are generated by integrating the carrier attributes that apply to each freight shipment and are customized to each freight shipment based on the real-time update and analysis of the fluctuating carrier attributes that apply to each freight shipment. Each integrated pricing package is provided to each freight client that incorporate the customized pricing parameters.

18 Claims, 7 Drawing Sheets

Related U.S. Application Data

(60) Provisional application No. 62/597,157, filed on Dec. 11, 2017.

(56) References Cited

U.S. PATENT DOCUMENTS

| | | | |
|---|---|---|---|
| 6,975,224 B2 | 12/2005 | Galley, III et al. | |
| 7,092,894 B1 | 8/2006 | Crone et al. | |
| 7,222,083 B2 | 5/2007 | Matheson et al. | |
| 7,225,981 B2 | 6/2007 | Jongebloed et al. | |
| 7,340,328 B2 | 3/2008 | Matheson et al. | |
| 7,343,314 B2 | 3/2008 | Matheson et al. | |
| 7,385,529 B2 | 6/2008 | Hersh et al. | |
| 7,395,237 B1 | 7/2008 | Hall et al. | |
| 7,401,055 B2 | 7/2008 | Melzer | |
| 7,539,624 B2 | 5/2009 | Matheson et al. | |
| 7,558,740 B2 | 7/2009 | Matheson et al. | |
| 7,593,871 B1 | 9/2009 | Mesaros et al. | |
| 7,698,204 B2 | 4/2010 | Abendroth et al. | |
| 7,755,518 B2 | 7/2010 | Hersh et al. | |
| 8,140,405 B2 | 3/2012 | Mesaros et al. | |
| 8,160,971 B2 | 4/2012 | Knight et al. | |
| 8,195,518 B2 | 6/2012 | Chowdhary et al. | |
| 8,249,942 B2 | 8/2012 | Mesaros et al. | |
| 8,306,851 B2 | 11/2012 | Dohm et al. | |
| 8,452,509 B2 | 5/2013 | Clarke et al. | |
| 8,706,564 B2 | 4/2014 | Mesaros et al. | |
| 8,725,656 B1 | 5/2014 | LaVoie et al. | |
| 8,799,178 B2 | 8/2014 | Gill et al. | |
| 10,074,065 B2 | 9/2018 | Jones et al. | |
| 10,268,982 B2 | 4/2019 | Sujan et al. | |
| 10,282,694 B2 | 5/2019 | Jones et al. | |
| 10,296,867 B2 | 5/2019 | Wells et al. | |
| 10,332,032 B2 | 6/2019 | Byrne et al. | |
| 10,776,748 B2 | 9/2020 | Jones et al. | |
| 10,789,566 B1 | 9/2020 | Masterman et al. | |
| 10,878,368 B2 | 12/2020 | Vaideeswaran et al. | |
| 10,896,401 B2 | 1/2021 | Berdinis et al. | |
| 10,977,604 B2 | 4/2021 | Berdinis et al. | |
| 11,009,359 B2 | 5/2021 | Petersen et al. | |
| 11,100,452 B2* | 8/2021 | Healy | G06Q 30/0207 |
| 2002/0007340 A1 | 1/2002 | Isaf | |
| 2002/0022983 A1 | 2/2002 | Barton | |
| 2002/0087371 A1 | 7/2002 | Abendroth | |
| 2002/0116318 A1 | 8/2002 | Thomas | |
| 2003/0200111 A1 | 10/2003 | Damji | |
| 2004/0002925 A1 | 1/2004 | Gordon | |
| 2004/0010432 A1 | 1/2004 | Matheson | |
| 2004/0030611 A1 | 2/2004 | Byrne | |
| 2004/0034556 A1 | 2/2004 | Matheson | |
| 2004/0093245 A1 | 5/2004 | Matheson | |
| 2004/0093313 A1 | 5/2004 | Bains | |
| 2004/0111309 A1 | 6/2004 | Matheson | |
| 2004/0172372 A1 | 9/2004 | Wells | |
| 2005/0154653 A1 | 7/2005 | Jongebloed | |
| 2005/0234757 A1 | 10/2005 | Matheson | |
| 2005/0278063 A1 | 12/2005 | Hersh | |
| 2007/0130090 A1 | 6/2007 | Staib et al. | |
| 2008/0162304 A1 | 7/2008 | Ourega et al. | |
| 2008/0228625 A1 | 9/2008 | Isaf et al. | |
| 2008/0281719 A1 | 11/2008 | Hall et al. | |
| 2008/0294491 A1 | 11/2008 | Hersh et al. | |
| 2009/0030770 A1 | 1/2009 | Hersh et al. | |
| 2009/0144109 A1 | 6/2009 | Knight et al. | |
| 2009/0307145 A1 | 12/2009 | Mesaros et al. | |
| 2011/0213649 A1 | 9/2011 | Mesaros et al. | |
| 2011/0246271 A1 | 10/2011 | Mesaros et al. | |
| 2011/0246274 A1 | 10/2011 | Mesaros et al. | |
| 2012/0046998 A1 | 2/2012 | Staib et al. | |
| 2012/0158609 A1 | 6/2012 | Dickman et al. | |
| 2012/0179526 A1 | 7/2012 | Mesaros et al. | |
| 2012/0265590 A1 | 10/2012 | Mesaros et al. | |
| 2013/0031017 A1 | 1/2013 | LaVoie et al. | |
| 2013/0132159 A1 | 5/2013 | Wells et al. | |
| 2013/0159059 A1 | 6/2013 | Malov et al. | |
| 2014/0229258 A1 | 8/2014 | Seriani et al. | |
| 2014/0250028 A1 | 9/2014 | Motsick et al. | |
| 2014/0279657 A1* | 9/2014 | Stowe | G06Q 10/08345 705/335 |
| 2014/0324633 A1 | 10/2014 | Pollak et al. | |
| 2014/0351036 A1 | 11/2014 | Mesaros et al. | |
| 2015/0026090 A1* | 1/2015 | Marrale | G06Q 10/08345 705/335 |
| 2015/0046198 A1* | 2/2015 | Daniel | G06Q 30/0611 705/5 |
| 2015/0310468 A1* | 10/2015 | Mesaros | G06Q 30/0206 705/7.35 |
| 2016/0071055 A1 | 3/2016 | Beckwitt et al. | |
| 2016/0086128 A1 | 3/2016 | Geiger et al. | |
| 2016/0104111 A1 | 4/2016 | Jones et al. | |
| 2016/0140455 A1 | 5/2016 | Dohm et al. | |
| 2016/0140456 A1 | 5/2016 | Loebertmann et al. | |
| 2016/0140483 A1 | 5/2016 | Dohm et al. | |
| 2016/0140495 A1 | 5/2016 | Dohm et al. | |
| 2016/0140498 A1 | 5/2016 | Dohm et al. | |
| 2016/0148155 A1 | 5/2016 | Barahona et al. | |
| 2016/0189102 A1 | 6/2016 | Schreiber et al. | |
| 2016/0239800 A1 | 8/2016 | Scharaswak et al. | |
| 2016/0335593 A1 | 11/2016 | Clarke et al. | |
| 2016/0350712 A1 | 12/2016 | Wesemann et al. | |
| 2017/0046658 A1 | 2/2017 | Jones et al. | |
| 2017/0169385 A1 | 6/2017 | High et al. | |
| 2017/0270468 A1 | 9/2017 | Natarajan et al. | |
| 2017/0344932 A1 | 11/2017 | Ahmadi et al. | |
| 2018/0068269 A1* | 3/2018 | Pillai | G06Q 10/08345 |
| 2018/0121829 A1 | 5/2018 | Chowdhary et al. | |
| 2018/0211217 A1 | 7/2018 | Berdinis et al. | |
| 2018/0211218 A1 | 7/2018 | Berdinis et al. | |
| 2018/0330324 A1 | 11/2018 | McCandless et al. | |
| 2018/0349849 A1 | 12/2018 | Jones et al. | |
| 2019/0005444 A1 | 1/2019 | Marrale et al. | |
| 2019/0172169 A1 | 6/2019 | Margand et al. | |
| 2019/0180234 A1 | 6/2019 | Healy et al. | |
| 2019/0213500 A1 | 7/2019 | Chowdhary et al. | |
| 2019/0251508 A1 | 8/2019 | Beckwitt et al. | |
| 2019/0266690 A1 | 8/2019 | Mandeno et al. | |
| 2019/0318286 A1 | 10/2019 | Simpson et al. | |
| 2019/0318309 A1 | 10/2019 | Vaideeswaran et al. | |
| 2020/0005206 A1 | 1/2020 | van Ryzin et al. | |
| 2020/0058044 A1 | 2/2020 | Deng et al. | |
| 2020/0134557 A1 | 4/2020 | Pevzner et al. | |
| 2020/0151816 A1 | 5/2020 | Simpson et al. | |
| 2020/0364664 A1 | 11/2020 | Chen et al. | |
| 2021/0035172 A1 | 2/2021 | Wang et al. | |
| 2021/0197813 A1 | 7/2021 | Houston et al. | |
| 2021/0198200 A1 | 7/2021 | Benenato et al. | |
| 2021/0201262 A1 | 7/2021 | Damon et al. | |

OTHER PUBLICATIONS

International Search Report; International Searching Authority; International Patent Application No. PCT/US2018/064966; Feb. 19, 2019; 2 pages.

Written Opinion; International Searching Authority; International Patent Application No. PCT/US2018/064966; Feb. 19, 2019; 8 pages.

* cited by examiner

| | |
|---|---|
| ← → C | http//pittohiolivelanespecials.com |

Live Lane Specials Dashboard
Logged in as J Doe

| Filters | Exclusions | Adjustments | Intelligent Pricing |

Lane Special Name*

Active Date

September 2017

| S | M | T | W | T | F | S |
|---|---|---|---|---|---|---|
| 27 | 28 | 29 | 30 | 31 | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |
| 1 | 2 | 3 | 4 | 5 | 6 | 7 |

Start Date * / /

End Date * / /

Start Time (Activate) * 10 : 30 : AM

End Time (Deactivate) * 10 : 30 : AM

Time Zone

Origin Zip Code * Destination Zip Code * Mile Radius * 30 ⊕

Origin Zip Code * Destination Zip Code * Mile Radius * 30 ⊖

Cubic Dimensions * ☐ x ☐ x ☐ ⊕

Pallet Counts * 30 to 30 ⊕

Shipment Price ($)

Min ($) Max ($)
30 : 30 ☐ Insurance ⊕

Pricing Program

Cont. On FIG.2B

Archived Specials

| Lane Special | # Loads Booked ⇅ | $ Loads Booked ⇅ | Active Date ⇅ |
|---|---|---|---|
| #150 | 10 | $2500.00 | 8/3/2017 |
| #134 | 42 | $10500.00 | 8/3/2017 |
| #148 | 15 | $3750.00 | 8/4/2017 |
| #23 | 16 | | 8/6/2017 |

| User ⬍ | Intelligent Pricing ⬍ | |
|---|---|---|
| J Doe | Y | ✎ |
| M Smith | Y | ✎ |
| M Smith | Y | ✎ |
| P Harrison | Y | ✎ |
| M Kelley | Y | ✎ |
| M Kelley | Y | ✎ |
| M Smith | Y | ✎ |
| M Kelley | Y | ✎ |

View all ⓘ

[Publish Special] [Activate Special] [Archive Special]

View all ⓘ

| # Loads Booked ⬍ | $ Loads B... | |
|---|---|---|
| 10 | $250 | |
| 39 | $975 | |
| 42 | $1050 | |
| 12 | $300 | |
| 15 | $3750.00 | P Hoffman |
| 6 | $1500.00 | M Kelley |
| 3 | $750.00 | J Doe |
| 16 | $4000.00 | M Kelley |

*This window shows you a quick glance at real time performance and time remaining.*

[Deactivate Special]

Loads Booked
$356250.00

View totals
○ Current Day
○ Past 7 Days
○ Past 14 Days
○ Current Month
○ Current Year Cont. From FIG.2B

FIG.2C

CUSTOMIZED INTEGRATED PRICING PACKAGES FOR FREIGHT SHIPMENT

CROSS-REFERENCE TO RELATED APPLICATIONS

The present application is a U.S. Continuation-in-Part Application which claims the benefit of U.S. Nonprovisional patent application Ser. No. 16/216,487, filed Dec. 11, 2018 which claims the benefit of U.S. Provisional Appl. No. 62/597,157, filed Dec. 11, 2017 which are both incorporated herein by reference in their entireties.

BACKGROUND

Carriers incorporate a complicated weave of logistics to fulfill the transport needs of freight clients requesting to have their freight shipments transported. Carriers are limited in their fleet resources in that carriers have a fixed number of trucks, trains, ships, and/or planes at their disposal for freight transportation and there is a fixed cost incurred by the carriers each time the carriers send a fleet resource to execute a delivery. Thus, carriers strive to have each fleet resource loaded to capacity to maximize their profits. Each delivery that is loaded at less than capacity results in the carriers earning less profit due to the fixed cost in executing the delivery.

Once a carrier has agreed to transport a freight shipment between two locations, the carrier has also incurred the fixed cost for sending the fleet resource to execute the delivery of the freight shipment. In order to maximize the profits in executing the delivery to offset the fixed cost, the carrier may offer discounts to entice freight clients that also have freight shipments that are to be transported between the two locations to enlist the carrier to transport their freight shipments as well. Conventionally, the carrier independently contacts each freight client to solicit the discount. Such independent solicitation immensely slows down what is typically an automated logistic management system implemented by both the carriers and the freight clients. Thus, the automated communication of and acceptance of discounts generated in real-time to each freight client of a carrier significantly increases the efficiency of the already complicated weave of logistics of freight shipment transportation.

BRIEF SUMMARY

Embodiments of the present disclosure relate to the automated communication of and acceptance of discounts for the transportation of freight shipments that are generated in real-time to account for the current state of the different transportation platforms provided by the carrier to provide customized discounts for each freight shipment. A system may be implemented to generate an integrated pricing package that incorporates attributes associated with a freight shipment that are updated and analyzed in real-time to provide a plurality of customized pricing parameters included in an integrated pricing package. The system includes at least one processor and a memory coupled with the processor. The memory includes instructions that when executed by the processor cause the processor to receive a plurality of requests from a plurality of freight clients to generate the integrated pricing package for each request. The processor is configured to update in real-time a plurality of carrier attributes associated with a carrier that is transporting each freight shipment for each freight client. The carrier attributes are associated with each different transportation platform provided by the carrier and fluctuate depending on an availability of each different transportation platform. The processor is configured to analyze in real-time the plurality of carrier attributes associated with the carrier to determine the carrier attributes that apply to each freight shipment requested by each freight client to transport by the carrier. The processor is configured to generate the plurality of customized pricing parameters for each freight shipment by integrating the carrier attributes that apply to each freight shipment. The customized pricing parameters are customized to each freight shipment based on the real-time update and analysis of the fluctuating carrier attributes that apply to each freight shipment. The processor is configured to provide each integrated pricing package to each freight client that incorporates the customized pricing parameters that are customized to each freight shipment.

In an embodiment, a method generates an integrated pricing package that incorporates attributes associated with a freight shipment that are updated and analyzed in real-time to provide a plurality of customized pricing parameters included in an integrated pricing package. A plurality of requests may be received from a plurality of freight clients to generate the integrated pricing package for each request. A plurality of carrier attributes associated with a carrier that is transporting each freight shipment for each freight client may be updated in real-time. The carrier attributes are associated with each different transportation platform provided by the carrier and fluctuate depending on an availability of each different transportation platform. The plurality of carrier attributes associated with the carrier may be analyzed in real-time to determine the carrier attributes that apply to each freight shipment requested by each freight client to transport by the carrier. The plurality of customized pricing parameters may be generated for each freight shipment by integrating the carrier attributes that apply to each freight shipment. The customized pricing parameters are customized to each freight shipment based on the real-time update and analysis of the fluctuating carrier attributes that apply to each freight shipment. The integrated pricing package may be provided to each freight client that incorporates the customized pricing parameters that are customized to each freight shipment.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

FIG. 2A depicts an example customized display that may be provided by intelligent pricing computing device and customized for each individual freight client computing device and carrier computing device that may be displayed to enable the corresponding freight client and/or carrier to efficiently engage in transport requests;

FIG. 2C depicts an example customized display that may be provided by intelligent pricing computing device and customized for each individual freight client computing device and carrier computing device that may be displayed to enable the corresponding freight client and/or carrier to efficiently engage in transport requests;

DETAILED DESCRIPTION

Figure 1:
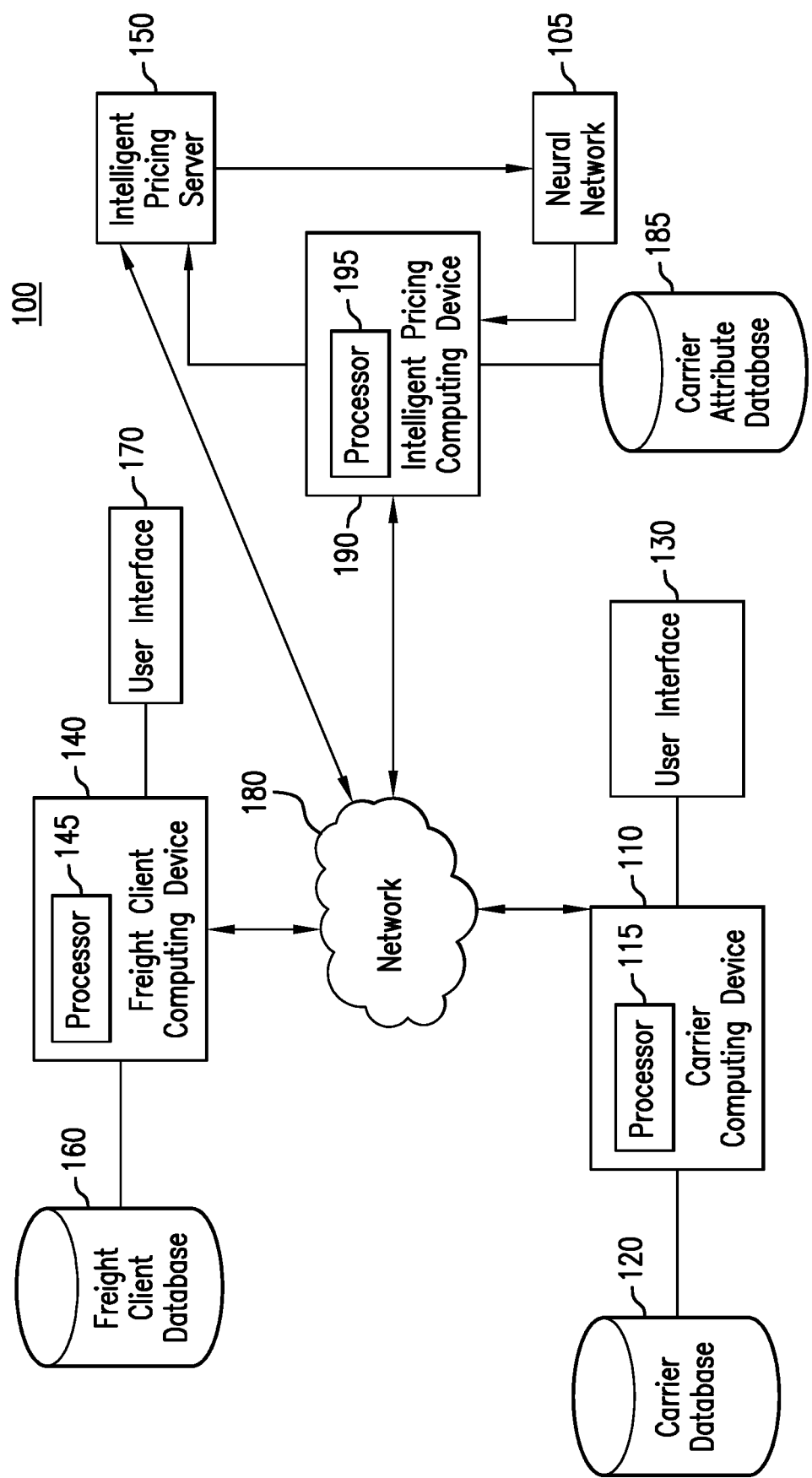
FIG. 1 shows an illustration of an intelligent pricing system.

Embodiments of the disclosure generally relate to the updating and analysis of the current state of the different transportation platforms, such as the different transportation routes that are currently being offered by the carrier and the availability of each, to generate customized discounts that are automatically communicated to the freight clients. In an example embodiment, a carrier may be offering numerous different transportation platforms to transport freight shipments between different locations supported by the different transportation platforms. In order for the carrier to ensure that each of the different transportation platforms are loaded to capacity, an intelligent pricing computing device may update and analyze in real-time the fluctuating carrier attributes, such as the current space available, for each of the different transportation platforms currently available for freight clients to engage to transport their freight shipments.

Based on the real-time update and analysis of the fluctuating current attributes, the intelligent pricing computing device may generate customized pricing parameters, such as discounts, for each freight client requesting to transport their freight shipments. The customized pricing parameters account for the current state of the fluctuating parameters and enables the carrier to offer the appropriate customized pricing parameters to entice freight clients to utilize the carrier to transport their freight shipments. In doing so, the carrier may be able increase the likelihood that each of the different transportation platforms are filled to capacity resulting in increased profits made by the carrier transporting each of the freight shipments via the different transportation platforms.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that I may be within the knowledge of one skilled in art to affect such feature, structure, or characteristic in connection with other embodiments whether or not explicitly described.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

System Overview

As shown in FIG. 1, an intelligent pricing system 100 includes an intelligent pricing computing device 190, a carrier attribute database 185, a carrier computing device 110, a carrier database 120, a user interface 130, a freight client computing device 140, a freight client database 160, and a user interface 170. Intelligent pricing computing device 190 includes a processor 195. Carrier computing device 110 includes a processor 115. Freight client computing device 140 includes a processor 145.

Intelligent pricing computing device 190 may be a device that is capable of generating customized pricing parameters for freight shipments based on the real-time update and analysis of fluctuating carrier attributes that apply to the freight shipments. Examples of intelligent computing device 190 may include a transportation management system, a warehouse management system, an organization system, a client enterprise resource planning system, a mobile telephone, a smartphone, a workstation, a portable computing device, other computing devices such as a laptop, or a desktop computer, cluster of computers, set-top box, a product inventory checking system and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Intelligent pricing computing device 190 may provide integrated pricing packages to freight clients that incorporate customized pricing parameters that are customized to each freight shipment. Freight clients are entities that have freight shipments that are to be transported from a first location to a second location. For example, a freight client may be a produce distribution company that distributes produce to various grocery stores and has a need to transport the produce from their central warehouse to each of the various grocery stores. Rather than have their own transportation platforms to execute their freight shipments, the freight client may enlist the services of a carrier that specializes in transporting freight shipments to different locations. A carrier is an entity that primarily specializes in transporting freight shipments for numerous freight clients in which the carrier owns a fleet of fleet resources that may be utilized to transport freight shipments between locations, such as trucks, trains, ships, and/or planes. The carrier typically does not have its own need to transport freight shipments, such as a produce distribution company that has a need to transport produce, but rather solicits their fleet resources to numerous freight clients that do not have their own fleet resources to fulfill the freight shipment needs of those numerous freight clients.

Carriers typically have numerous fleet resources and in order to increase the utilization of those fleet resources, carriers typically have numerous freight clients that the carriers rely on to provide freight shipments that are to be transported. Each of those freight clients may have numerous different freight shipments required to be transported in a single day with each of those numerous different freight shipments having to be transported between different locations thus each of the numerous different freight shipments requiring different transportation routes. For example, a carrier may have hundreds of different freight clients that each utilize the numerous trucks owned by the carrier on a daily basis such that each of the trucks are constantly transporting different freight shipments between different locations for the hundreds of different freight clients on a daily basis.

Thus, carriers incorporate a complicated weave of logistics to fulfill the transport needs of their numerous freight clients requesting to have their numerous different freight shipments transported between numerous different locations on a daily basis. In order to incorporate the complicated weave of logistics, carriers may constantly interface with the numerous different freight clients in order to identify the different requests that each of the numerous freight clients have in transporting their numerous different freight shipments. In turn, the carriers may then constantly interface with their own fleet resources to determine the different transportation platforms that are available to transport the different freight shipments and which of the different transportation platforms would be the most efficient in executing the different freight shipments. A transportation platform is a resource that the carrier may utilize to transport a freight shipment as requested by a freight client. For example, a transportation platform is a truck that the carrier has located in Cincinnati, Ohio that has the appropriate space available on the truck to transport a freight shipment to Pittsburgh, Pennsylvania at the time the freight client requests to have their freight shipment transported from Cincinnati to Pittsburgh.

Intelligent pricing computing device 190 may provide a central platform that is an interface between carriers and freight clients that enables each of the carriers to engage each of their freight clients in real-time with regard to identifying the needs of each of the freight clients regarding transporting their different freight shipments. Intelligent pricing computing device 190 may maintain connectivity between the carriers and the freight clients such that the freight clients may submit their request for transporting freight shipments via intelligent pricing computing device 190. The carriers may then identify those requests in real-time via intelligent pricing computing device 190 and engage the freight clients in real-time via the intelligent pricing computing device 190 to fulfill those requests for transporting freight shipments.

Rather than each carrier having to independently engage each of the different freight clients to identify the transport needs of each of the freight clients and then solicit their ability to satisfy those transport needs, intelligent pricing computing device 190 may enable the carriers to identify in real-time potential freight clients with freight shipments that satisfy the availability of the different transportation platforms and solicit those potential freight clients in real-time in an attempt to fill the available transportation platforms. For example, the carrier has partially filled a truck with a freight shipment in Cincinnati that is to be transported to Pittsburgh. The carrier would like to fill the truck with additional freight shipments that are in Cincinnati and are to be transported to Pittsburgh in order to fill the truck to capacity. Rather than having to individually email and/or call each of the numerous freight clients to determine if any of those freight clients have a freight shipment that is in Cincinnati and needs to be transported to Pittsburgh, the carrier may identify any such freight shipments in real-time via intelligent pricing computing device 190.

One or more freight client computing devices 140 may engage intelligent pricing computing device 190 in order to interface with each of the carriers in real-time regarding their request for transporting their freight shipments. Examples of freight client computing device 140 may include a transportation management system, a warehouse management system, an organization system, a client enterprise resource planning system, a mobile telephone, a smartphone, a workstation, a portable computing device, other computing devices such as a laptop, or a desktop computer, cluster of computers, set-top box, a product inventory checking system and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

One or more carrier computing devices 110 may also engage intelligent pricing computing device 190 in order to interface with each of the freight clients in real-time regarding the different requests for freight shipment transport as well as soliciting to fulfill those requests. Examples of carrier computing device 110 may include a transportation management system, a warehouse management system, an organization system, a client enterprise resource planning system, a mobile telephone, a smartphone, a workstation, a portable computing device, other computing devices such as a laptop, or a desktop computer, cluster of computers, set-top box, a product inventory checking system and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Real-time is the updated information available to intelligent pricing computing device 190 when the carrier and/or freight client requests to analyze the information. For example, real-time may include the different freight clients have submitted requests to intelligent pricing computing device 190 to have freight shipments transported when the carrier requests to evaluate such available requests. In another example, real-time may include the different carriers that have submitted solicitations to transport freight shipments via intelligent pricing computing device 190 when the freight client requests to have a freight shipment transported. Thus, real-time may be the period of time between updates executed by intelligent pricing computing device 190 to obtain the updated information from carrier computing devices 110 and freight client computing devices 140. For example, intelligent pricing computing device 190 may obtain updated information from carrier computing devices 110 and freight computing devices 140 every nanosecond, millisecond, second, minute, period of minutes and/or any other period of time between updates executed by intelligent pricing computing device 190 that will be apparent from those skilled in the relevant art(s) without departing from the spirit and scope of the present disclosure.

As noted above, each carrier may have numerous freight clients. Intelligent pricing computing device 190 may provide a platform of connectivity to enable each carrier to not only engage their own numerous freight clients but also the numerous freight clients of each other participating carrier. Thus, intelligent pricing computing device 190 may provide a platform of connectivity so that numerous types of transportation data may be communicated between numerous carrier computing devices 110 and numerous freight client computing devices 140. For example, 1,500 different carriers may engage intelligent computing device 190 in an attempt to evaluate different requests for transporting freight shipments. The 1,500 carriers may have 35,000 different freight clients. Intelligent pricing computing device 190 may provide the platform of connectivity for 1,500 different carriers to entertain requests for transporting freight shipments from 35,000 different freight clients which may equate to hundreds of thousands of different requests for transporting freight shipments. Such an expansive platform of connectivity may significantly increase the likelihood that each participating carrier may fill each transportation platform to capacity as well as increasing the likelihood that each participating freight client may identify a carrier to transport their freight shipment.

Providing such an expansive platform of connectivity by intelligent pricing computing device 190 between numerous freight client computing devices 140 and carrier computing devices 110 may result in an immense amount of transportation data that is streamed between intelligent pricing computing device 190 and numerous freight client computing devices 140 and carrier computing devices 110. Intelligent pricing computing device 190 may interface with any type of management system supported by each different freight computing device 140 and carrier computing device 110. In doing so, transportation data generated by each different freight computing device 140, carrier computing device 110 and intelligent computing device 190 may be easily streamed between each other. For example, intelligent pricing computing device 190 may interface with a transportation management system, a warehouse management system, an organization system, a client enterprise resource planning system and/or any other type of management system supported by freight client computing devices 140 and carrier computing devices 110 that will be apparent from those skilled in the relevant art(s) without departing from the spirit and scope of the present disclosure.

As shown, transportation data may be streamed between numerous carrier computing devices 110, numerous freight client computing devices 140, and intelligent pricing computing device 190 via network 180. Network 180 includes one or more networks, such as the Internet. In some embodiments of the present disclosure, network 120 may include one or more wide area networks (WAN) or local area networks (LAN). Network 120 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 120 takes place using one or more network communication protocols including reliable streaming protocols such as transmission control protocol (TCP). Each of the numerous freight client computing devices 140 and carrier computing devices 110 may interface with intelligent pricing computing device 190 via network 180 through an application programming interface (API), web interface and/or any other type of interface that will be apparent from those skilled in the relevant art(s) without departing from the spirit and scope of the present disclosure. These examples are illustrative and not intended to limit the present disclosure.

Transportation data includes data associated with the requests for transporting the freight shipments by the freight clients as well as the data associated with the carrier in attempting to execute those freight shipments. As noted above, numerous carriers and freight clients may engage intelligent pricing computing device 190 to have their freight shipment needs satisfied whether fulfilling requests to transport freight shipments and/or utilize available transportation platforms to transport the freight shipments. With such an immense amount of freight clients and carriers engaging intelligent pricing computing device 190 on a daily basis, the amount of transportation data that is streamed via intelligent pricing computing device 190 to freight client computing devices 140 and carrier computing devices 110 is also immense. In order for freight clients and carriers to adequately negotiate what is involved in fulfilling such numerous requests to transport freight shipments, an immense amount of transportation data is streamed back and forth via intelligent pricing computing device 190 so that the freight clients and carriers may have sufficient information to intelligently agree upon the terms of fulfilling each of the numerous requests to transport freight shipments.

Intelligent pricing computing device 190 may stream the immense amount of transportation data to and from each of the numerous freight client computing devices 140 and carrier computing devices 110 in real-time such that each of the freight clients and carriers may have the transportation data available to negotiate the execution of the requests to transport freight shipments. For example, intelligent pricing computing device 190 may stream transportation data in real-time to the numerous freight client computing devices 140 and carrier computing devices 110 that includes but is not limited to rates, transit times, dispatching to schedule the pickup, tracking, tracing, invoices for executing the transport request, dates of transport, zip codes of shipment route, size of freight shipment, number of pallets, rate for transporting the freight shipment, freight shipments booked by each carrier with each freight client, dollar amount of freight shipments booked by each carrier, pickup accessories, exclusionary characteristics of freight shipments that are to be excluded, payment type, shipping accessories required to execute the transport of the freight shipments, adjustments to the quote, intelligent pricing, and/or any other type of transportation data that assists the freight clients and the carriers to negotiate the execution of the requests to transport freight shipments that will be apparent from those skilled in the relevant art(s) without departing from the spirit and scope of the present disclosure.

As noted above, numerous carriers and freight clients may engage intelligent pricing computing device 190 to have their freight shipment needs satisfied whether fulfilling requests to transport freight shipments and/or utilize available transportation platforms to transport the freight shipments. Such a numerous amount of carriers and freight clients engaging intelligent pricing computing device 190 may result in an immense amount of requests for transporting freight shipments being generated in real-time on a moment by moment basis. For example, 1,500 carriers engage intelligent pricing computing device 190 and 35,000 freight clients. Of those 35,000 freight clients, hundreds of thousands of requests to transport freight shipments may be generated on a daily basis by the 35,000 freight clients. Each of the 1,500 carriers cannot feasibly review hundreds of thousands of requests to transport freight shipments to determine whether the available transportation platforms for the carrier may be utilized to execute the transport requests.

Further, freight clients and carriers are under pressure to execute decisions regarding executing requests to transport freight shipments in short time intervals. Freight clients often have to have their freight shipments transported within short time intervals and carriers have to have their available transportation platforms filled to capacity as quickly as possible in order to increase their profitability. The less utilization of the available transportation platforms by the carriers results in less profit earned by the carriers. For example, freight clients and carriers may have to evaluate the available options with regard to executing the numerous requests to transport freight within a matter of seconds in order for the carriers to quickly take action in executing the transport requests to utilize their available transportation platforms and the freight clients have to have their freight shipments transported in a timely manner. Thus, freight clients and carriers have to evaluate the immense amount of transportation data for each of the immense amount of available transport requests quickly.

Intelligent pricing computing device 190 may streamline the immense amount of requests to transport freight shipments generated in real-time and filter the requests to those that are applicable to the availability of transportation platforms that the carrier is seeking to utilize. Intelligent pricing computing device 190 may also streamline the immense amount of carriers that have availability of transportation platforms to those that are applicable to the needs of the freight shipments that the freight client is seeking to have transported. Intelligent pricing computing device 190 may then streamline and provide the appropriate transportation data associated with the appropriate transport requests and availability of transportation platforms to each of the numerous freight client computing devices 140 and carrier computing devices 110 as customized to each freight client computing device 140 and carrier computing device 110. In doing so, intelligent pricing computing device 190 may serve as the single platform necessary for both freight clients to have their transport requests fulfilled and for carriers to satisfy their available transportation platforms. All of the necessary transportation data may be provided in a streamlined manner by intelligent computing device 190 such that the freight clients and carriers do not have to consult any other platform.

Intelligent pricing computing device 190 may filter the immense amount of requests to transport freight shipments as well as the immense amount of carriers that have availability of transportation platforms based on attributes associated with each of the freight shipments requested to be transported by the freight clients as well as carrier attributes that are associated with each of the different transportation platforms offered by the carriers. Attributes associated with each of the freight shipments specify the types of characteristics unique to the freight shipment and provide insight as to what is required to adequately transport the freight shipment to the satisfaction of the freight client. For example, a produce distributor may require that 10 pallets of assorted fruits be transported from Cincinnati to Pittsburgh within 24 hours in a refrigerated trailer to ensure that the assorted fruits remain fresh upon delivery in Pittsburgh. In such an example the attributes associated with the freight shipment include the size of the freight shipment in 10 pallets, the type of freight shipment in assorted fruits, the route of the freight shipment in Cincinnati to Pittsburgh, the timeline of delivery of within 24 hours, and a temperature requirement that requires refrigeration.

Carrier attributes associated with each of the different transportation platforms provided by the carrier specify the types of characteristics unique to the transportation platform provided by the carrier and provide insight as to the types of freight shipments that the carrier would like to transport based on the available transportation platforms to increase the utilization of the available transportation platforms. For example, a carrier has a truck in Cincinnati that currently has 14 pallets of availability and is to be routed to Pittsburgh within the next 24 hours with its current freight shipment of 10 pallets and is a refrigerated trailer. In such an example, the carrier attributes associated with the available transportation platform is the type of transportation platform of a truck, current space available is 14 pallets, the route of the available transportation platform is Cincinnati to Pittsburgh, the timeline requirement for delivery is within 24 hours, and refrigeration is available.

The carrier attributes associated with each of the different transportation platforms may fluctuate depending on the availability. As the carrier is able to accept different requests to transport freight shipments, the carrier attributes of each of the different transportation platforms fluctuate. For example, as a carrier accepts a request to transport 4 pallets of assorted fruits to a truck that already has 10 pallets of assorted fruits allocated to it to transport from Cincinnati to Pittsburgh in the next 24 hours on a refrigerated truck, the carrier attribute of the amount of availability for that particular transportation platform decreases from 14 pallets of availability to 10 pallets of availability upon the acceptance of the request to transport the 4 pallets in addition to the 10 pallets already allocated to the transportation platform. Thus, the carrier attributes associated with the different transportation platforms offered by the carriers may constantly fluctuate as each of the different carriers accept different requests to transport freight shipments to strive to fully utilize their available transportation platforms.

The freight client may identify each of the attributes associated with a freight shipment when entering their request to transport the freight shipment via freight client computing device 140. Of the numerous freight client computing devices 140 that are generating an immense amount of requests to transport freight shipments on an ongoing basis, intelligent pricing computing device 190 may filter the immense amount of transport requests in real-time based on the identified attributes for each of the different transport requests. The carrier may also identify each of the carrier attributes associated with their available transportation platforms via carrier computing device 110. Of the numerous carrier computing devices 110 that are generating an immense amount of inquiries with regard to available transport requests to utilize their available transportation platforms on an ongoing basis, intelligent pricing computing device 190 may also filter the immense amount of transport requests in real-time based on the identified carrier attributes provided by the carriers.

In filtering through the immense amount of transport requests in real-time based on the attributes of each of the transport requests and the carrier attributes associated with the available transportation platforms, intelligent pricing computing device 190 may customize the transport requests that are provided to each carrier as well as the available transportation platforms to each freight client to those that are applicable to each specific carrier and freight client. As noted above, hundreds of thousands of requests to transport freight shipments may be generated on a daily basis and accessed by intelligent pricing computing device 190. Rather than each carrier having to review hundreds of thousands of transport requests to evaluate as to which transport requests to engage to most efficiently utilize their available transportation platforms, intelligent pricing computing device 190 may customize the transport requests that may be viewed by the carrier based on those transport requests that have attributes associated with the freight shipments that satisfy the carrier attributes selected by the carrier that apply to the available transportation platforms of the carrier. In doing so, each individual carrier may efficiently evaluate in real-time the available transport requests that specifically apply to the transportation platforms currently available to the carrier and then quickly make decisions as to the transport requests that the carrier would like to engage to most efficiently utilize their available transportation platforms.

For example, the carrier may select via carrier computing device 110 the carrier attributes associated with the available transportation platform as the type of transportation platform of a truck, current space available is 14 pallets, the route of the available transportation platform is Cincinnati to Pittsburgh, the timeline requirement for delivery is within 24 hours, and refrigeration is available. Rather than the carrier having to evaluate hundreds of thousands of different requests for transporting freight shipments available from 35,000 different freight clients as accessed by intelligent pricing computing device 190, intelligent pricing computing device 190 may filter the hundreds of thousands of transport requests to those transport requests that have attributes that satisfy the carrier attributes for the available transportation platform of the carrier. In such an example, pricing computing device 190 may filter the hundreds of thousands of transport requests to those transport requests that can be transported on a truck, is a quantity of 14 pallets or less, are to be transported from Cincinnati to Pittsburgh, are available to be transported within 24 hours, and may be exposed to refrigeration. In doing so, the carrier may then evaluate the transport requests that are customized to the carrier attributes of the available transportation platform to evaluate quickly as to the transport requests that the carrier would like to undertake to most efficiently utilize their available transportation platform.

As noted above, freight clients are continuously submitting requests to transport freight shipments to intelligent pricing computing device 190 and carriers are continuously accepting transport requests and in doing so triggers a constant fluctuation in the carrier attributes for each transportation platform due to the availability of each transportation platform changing upon the acceptance of a transport request. Intelligent pricing computing device 190 may update and analyze in real-time the attributes associated with each of the numerous transport requests submitted by the freight clients as well as the fluctuating carrier attributes associated with the numerous different transportation platforms. In doing so, intelligent pricing computing device 190 may customize the transport requests that are streamlined to the carrier based on the real-time availability of transport requests that have attributes that satisfy the carrier attributes of the real-time availability of transportation platforms. This may enable both freight clients and carriers to efficiently come to agreement as to the terms of executing the transport requests based on the real-time status of attributes that satisfy the carrier attributes.

Figure 2B:
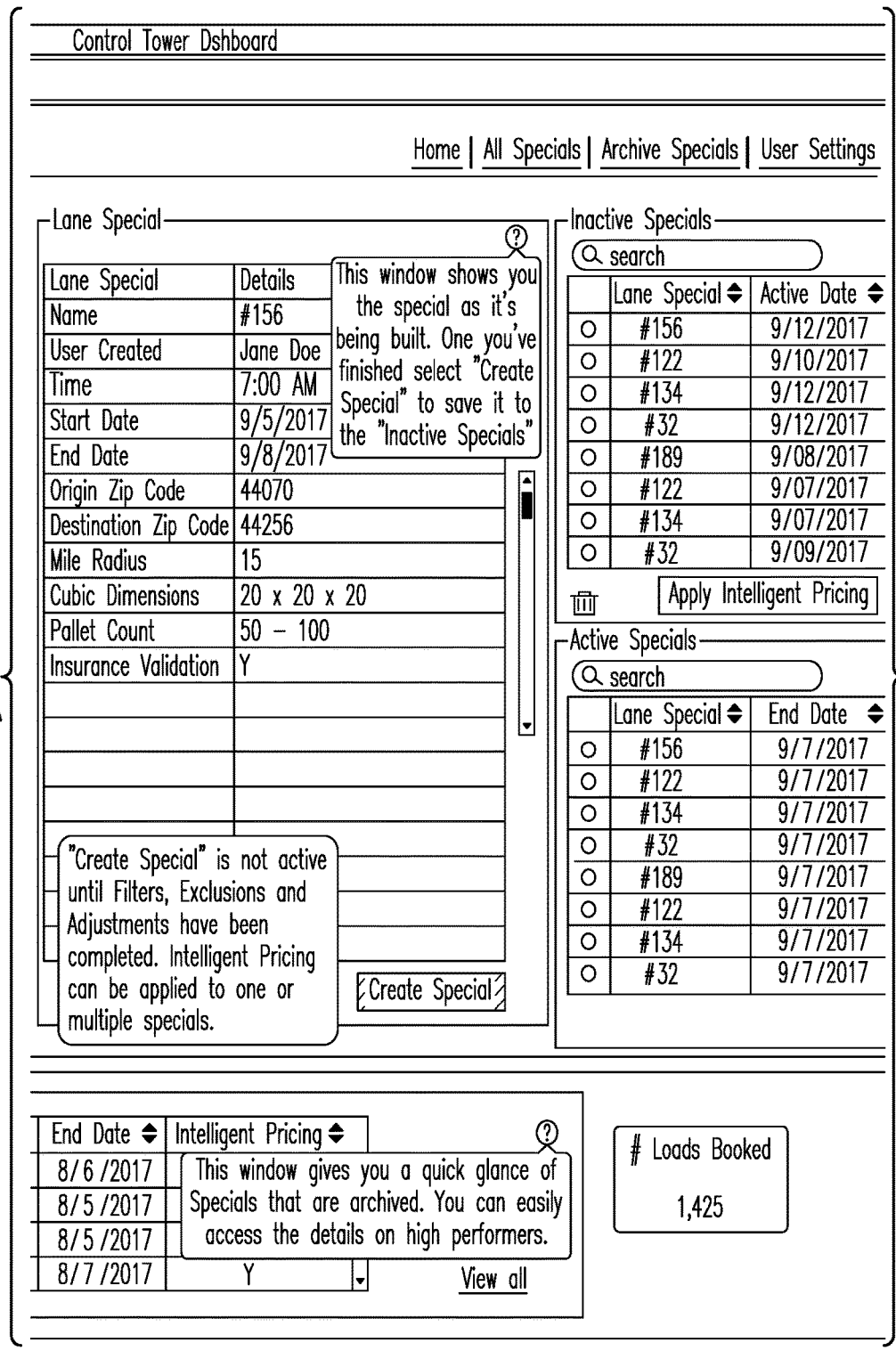
FIG. 2B depicts an example customized display that may be provided by intelligent pricing computing device and customized for each individual freight client computing device and carrier computing device that may be displayed to enable the corresponding freight client and/or carrier to efficiently engage in transport requests.

Intelligent pricing computing device 190 may then provide in real-time the streamlined and appropriate transportation data as customized to each individual freight client computing device 140 via user interface 170 and each individual carrier computing device 110 via user interface 130. In doing so, each carrier may easily evaluate in real-time the transportation data associated with the current requests to transport freight shipments that are customized based on the attributes of each request that satisfy the carrier attributes of the current availability of transportation platforms. Each freight client may also in real-time easily evaluate the transportation data associated with the available transportation platforms offered by each carrier that are customized based on the attributes of each request that satisfy the carrier attributes of the current availability of transportation platforms. Thus, each of the numerous carriers may easily view the transportation data of the customized transport requests via user interface 130 of their corresponding carrier computing device 110 and each of the numerous freight clients may easily view the transportation data of the customized available transportation platforms via user interface 170 of their corresponding freight client computing device 140. FIGS. 2A, 2B, and 2C depicts an example customized display 200 that may be provided by intelligent pricing computing device 190 and customized for each individual freight client computing device 140 and carrier computing device 110 that may be displayed to enable the corresponding freight client and/or carrier to efficiently engage in transport requests.

User interface 130 and user interface 170 may include any type of display device including but not limited to a touch screen display, a cathode ray tube (CRT) monitor, a liquid crystal display (LCD) screen, and/or any other type of display device that includes a display that will be apparent from those skilled in the relevant art(s) without departing from the spirit and scope of the present disclosure.

Intelligent pricing computing device 190 providing streamlined transportation data in real-time to each freight client computing device 140 and each carrier computing device 110 such that the transportation data is customized for each freight client and carrier enables the intelligent pricing computing device 190 to also generate an integrated pricing package for each request to transport a freight shipment. As noted above, carriers are under pressure to ensure that their transportation platforms are as close to capacity as possible in order to increase their profitability with regard to utilizing their transportation platforms to transport the freight shipments. The less each transportation platform is from capacity when transporting the freight shipment for a particular transport route, the less profitable the transport is for the carrier.

Once the carrier commits to executing a request to transport a freight shipment for a freight client and commits a transportation platform to transport the freight shipment, a fixed cost is automatically associated with the transportation platform in having to transport the freight shipment despite whether the transportation platform is at capacity. For example, once a transportation platform is committed to transporting a freight shipment, there is a fixed cost associated with fuel consumed by the transportation platform to transport the freight shipment, the cost of the driver/pilot to operate the transportation platform along the required route, to load and unload the freight shipment from the transportation platform and so on. This fixed cost is associated with the transportation platform once the carrier commits the transportation platform to executing a transport request regardless as to whether the transport request fills the transportation platform to capacity as this fixed cost is required to execute the transport request.

Often times, the carrier may commit to executing a transport request for a freight shipment with a transportation platform when the freight shipment does not occupy the full capacity of the transportation platform. With numerous transportation platforms positioned in numerous different locations and with each needed to execute transport requests to be profitable, the carrier may often times commit to executing transport requests that do not occupy the full capacity of the transportation platform. As noted above, an immense amount of transport requests is constantly submitted to intelligent pricing computing device 190 on a daily basis but only a percentage of those transport requests may satisfy the carrier attributes for the available transportation platforms of the carrier. Thus, the carrier may not be confident that a single transport request may be submitted requires a transportation platform at full capacity to execute the transport request in the location that the transportation platform is currently located. The carrier may then accept transport requests that require less than the capacity of the transportation platform to ensure the that the transportation platform is at least utilized and does not remain dormant.

In accepting transport requests that fail to utilize the full capacity of the transportation platform, the carrier may then be under increased pressure to locate additional transport requests that satisfy the carrier attributes of the transportation platform that has a partial capacity already committed to other transport requests in an attempt to fully utilize the capacity of the transportation platform. As noted above, the carrier now has a fixed cost associated with committing to execute the transport request that fails to utilize the full capacity of the transportation platform and has to find additional requests to transport freight shipments with the transportation platform in order to increase the profitability of executing the route by the transportation platform. However, once the carrier commits to executing a transport request that fails to utilize the full capacity of the transportation platform, the carrier is limited to entertaining additional transport requests that satisfy the carrier attributes of the already accepted transport request.

For example, the carrier initially accepts a transport request to transport 10 pallets of assorted fruits from Cincinnati to Pittsburgh in the next 24 hours on a truck with a refrigerated trailer that is currently located in Cincinnati. The carrier is now committed to a fixed cost associated with transporting the 10 pallets of assorted fruits to Pittsburgh in the next 24 hours on a refrigerated trailer. However, the capacity of the truck is 24 pallets and thus the truck has availability to transport an additional 14 pallets of freight shipment that can withstand refrigeration to Pittsburgh in the next 24 hours. In order to increase the profitability of utilizing the truck to transport the freight shipment from Cincinnati to Pittsburgh, the carrier is under pressure to locate additional transport requests with carrier attributes that include up to 14 additional pallets of freight shipment that are located in Cincinnati and are required to be transported to Pittsburgh and are available for transport in the next 24 hours in order to fully utilize the capacity of the truck to increase the profitability of utilizing the truck.

Thus, the carrier may be inclined to offer discounts to freight clients that have requests to transport freight shipments that satisfy the specific carrier attributes of the transportation platform that the carrier has already committed to executing a transport request to entice the freight clients to utilize the transportation platform in executing their transport requests. For example, the carrier may be inclined to offer a discount to a freight client that has a transport request to transport 4 additional pallets of assorted fruits from Cincinnati to Pittsburgh in the next 24 hours as that transport request satisfies the carrier attributes of the transport request already committed to by the carrier. In offering the discount, the carrier may more easily entice the freight client to utilize the carrier's truck to execute the transport request and in doing so may increase the utilization of the truck from 10 pallets to 14 pallets and thereby increase the profitability in utilizing the truck to execute the route of delivering the pallets from Cincinnati to Pittsburgh in the next 24 hours.

As noted above, intelligent pricing computing device 190 may update in real-time carrier attributes associated with a carrier that is transporting each freight shipment for each freight client where the carrier attributes are associated with each different transportation platform provided by the carrier and fluctuate depending on an availability for each different transportation platform. In doing so, carrier attributes that fluctuate constantly based on the carrier accepting different requests to transport freight shipments may be captured and updated by intelligent pricing computing device 190.

Intelligent pricing computing device 190 may also analyze in real-time the carrier attributes to determine the carrier attributes that apply to each freight shipment requested by each freight client to be transported. Despite the immense amount of transport requests submitted to intelligent pricing computing device 190 freight clients and the immense amount of transportation platforms with carrier attributes that are constantly fluctuating, intelligent pricing computing device 190 may streamline and customize the transport requests that satisfy the updated current attributes of the available transportation platforms for a specific carrier in real-time such that the carrier may easily analyze the available transport requests that satisfy the carrier parameters of the transportation platforms for the carrier.

In doing so, intelligent pricing computing device 190 may also generate customized pricing parameters for each freight shipment by integrating the carrier attributes that apply to each freight shipment. The customized pricing parameters may be customized based on the real-time update and analysis of the fluctuating carrier attributes that apply to each freight shipment. Customized pricing parameters may be parameters that are customized by intelligent pricing computing device 190 for a specific transport request of freight shipment to incorporate the current state of carrier attributes so that the customized pricing parameters are customized to the current availability of transportation platforms with regard to executing the specific transport request. For example, the customized pricing parameters may be different discounts that are generated by intelligent pricing computing device 190 for a specific transport request that incorporate the current state of carrier attributes for the current availability of transportation platforms to entice the freight client to accept the carrier's transportation platform as the mode to have their transport request fulfilled by the carrier.

Intelligent pricing computing device 190 may then provide an integrated pricing package to each freight client that incorporates the customized pricing parameters that are customized to each freight shipment. The integrated pricing package may be the pricing package offered to each freight client that if accepted by the freight client grants the freight client each of the customized pricing parameters included in the integrated pricing package while enabling the carrier to increase their profitability in transporting the freight shipment. As noted above, each customized pricing parameter incorporated into the integrated pricing package is based on the complicated weave and interaction of the current state of carrier attributes and enables intelligent pricing computing device 190 to provide an integrated pricing package that balances the need for the carrier to utilize the capacity of the available transportation platforms while doing so to increase their profitability.

For example, the carrier initially accepts a transport request to transport 10 pallets of assorted fruits from Cincinnati to Pittsburgh in the next 24 hours on a truck with a refrigerated trailer that is currently located in Cincinnati. The carrier is now committed to a fixed cost associated with transporting the 10 pallets of assorted fruits to Pittsburgh in the next 24 hours on a refrigerated trailer. However, the capacity of the truck is 24 pallets and thus the truck has availability to transport an additional 14 pallets of freight shipment that can withstand refrigeration to Pittsburgh in the next 24 hours. Intelligent pricing computing device 190 may update the carrier attributes associated with each of the carrier's transportation platforms in real-time and analyze those updated carrier attributes to determine the available transport requests that satisfy those updated carrier attributes.

Intelligent pricing computing device 190 may then identify a freight client that has a transport request for 10 additional pallets that satisfy the carrier attributes of being located in Cincinnati, are to be transported to Pittsburgh and are available to be transported in the next 24 hours and may be susceptible to refrigeration. Intelligent pricing computing device 190 may then generate customized pricing parameters based on the real-time update and analysis of the carrier attributes to determine that a customized pricing parameter of a 4% discount may be offered to the freight client. The 4% discount incorporates in real-time the updated carrier attributes and provides the carrier the incentive to offer to the freight client the discount to bring the utilization of the truck from 10 pallets to 20 pallets and in doing so further increases the profitability of the carrier in executing the transport request at the discounted rate.

In addition to the 4% discount, the intelligent pricing computing device 190 may then once again update the carrier attributes in real-time and analyze the updated carrier attributes in real-time to determine that the truck is now at a capacity of 20 pallets and only needs 4 additional pallets to be at capacity. However, intelligent pricing computing device 190 may determine that the likelihood of finding a transport request of only 4 additional pallets that satisfy the updated carrier attributes of being located in Cincinnati, are to be transported in Pittsburgh and are available to be transported in the next 24 hours and may be susceptible to refrigeration may be decreased due to the real-time analysis of current transport requests submitted to intelligent pricing computing device 190. Thus, intelligent pricing computing device 190 may generate an additional customized pricing parameter of a 10% discount for any transport request of 4 pallets that satisfy the updated carrier attributes. In doing so, the carrier may increase its profitability by having the truck at full capacity of 24 pallets despite offering a 10% discount for the 4 additional pallets. Intelligent pricing computing device 190 may then incorporate the customized pricing parameters of a 5% discount on the 10 pallet transport request and then the additional 10% incentive discount of an additional 4 pallet transport into the integrated pricing package and provide the integrated pricing package to the freight client via freight client computing device 140.

Intelligent pricing computing device 190 may analyze in real-time all of the transport requests submitted to intelligent pricing computing device 190 by the immense amount of freight client computing devices 140 as well as analyze in real-time the updated carrier attributes for each of the immense amount of transportation platforms available for each participating carrier to determine the transport requests that satisfy the updated carrier attributes. Intelligent pricing computing device 190 may then determine in real-time customized pricing parameters for each of the transport requests that satisfy the updated carrier attributes such that the customized pricing parameters increase the profitability of the carrier in filling the capacity of the available transportation platforms based on the current state of the carrier attributes.

Rather than the carrier having to calculate discounts on their own for each transport request and then step out of the automated system to solicit those discounts to the to the appropriate freight client via email or phone, intelligent pricing computing device 190 may determine the customized pricing parameters in real-time based on the current state of the updated carrier attributes and provide those customized pricing parameters to each specific freight client in an integrated pricing package. In doing so, the carrier may commit to executing transport requests at the moment the transport request is available as well as the availability of the transportation platform at such a moment with customized pricing parameters that increase the profitability of the carrier if the freight client agrees to the integrated pricing package without delaying the decision making and/or negotiating process. Thus, the carrier may via carrier computing device 110 navigate through thousands of transactions a day with regard to filling their available transportation platforms to capacity and to do so in a manner that increases their profitability without sacrificing valuable time.

Intelligent Pricing

As noted above, intelligent pricing system 100 may update and analyze in real-time carrier attributes that are associated with the different transportation platforms provided by each of the carriers and fluctuate depending on the availability of the different transportation platforms. Intelligent pricing computing device 190 may then generate customized pricing parameters for each request to transport freight shipments that are customized based on the real-time update and analysis of the fluctuating carrier attributes that apply to each of the freight shipments. Intelligent pricing computing device 190 may then provide an integrated pricing package to the freight clients that incorporate each of the customized pricing parameters that apply to the transport request.

Figure 3:
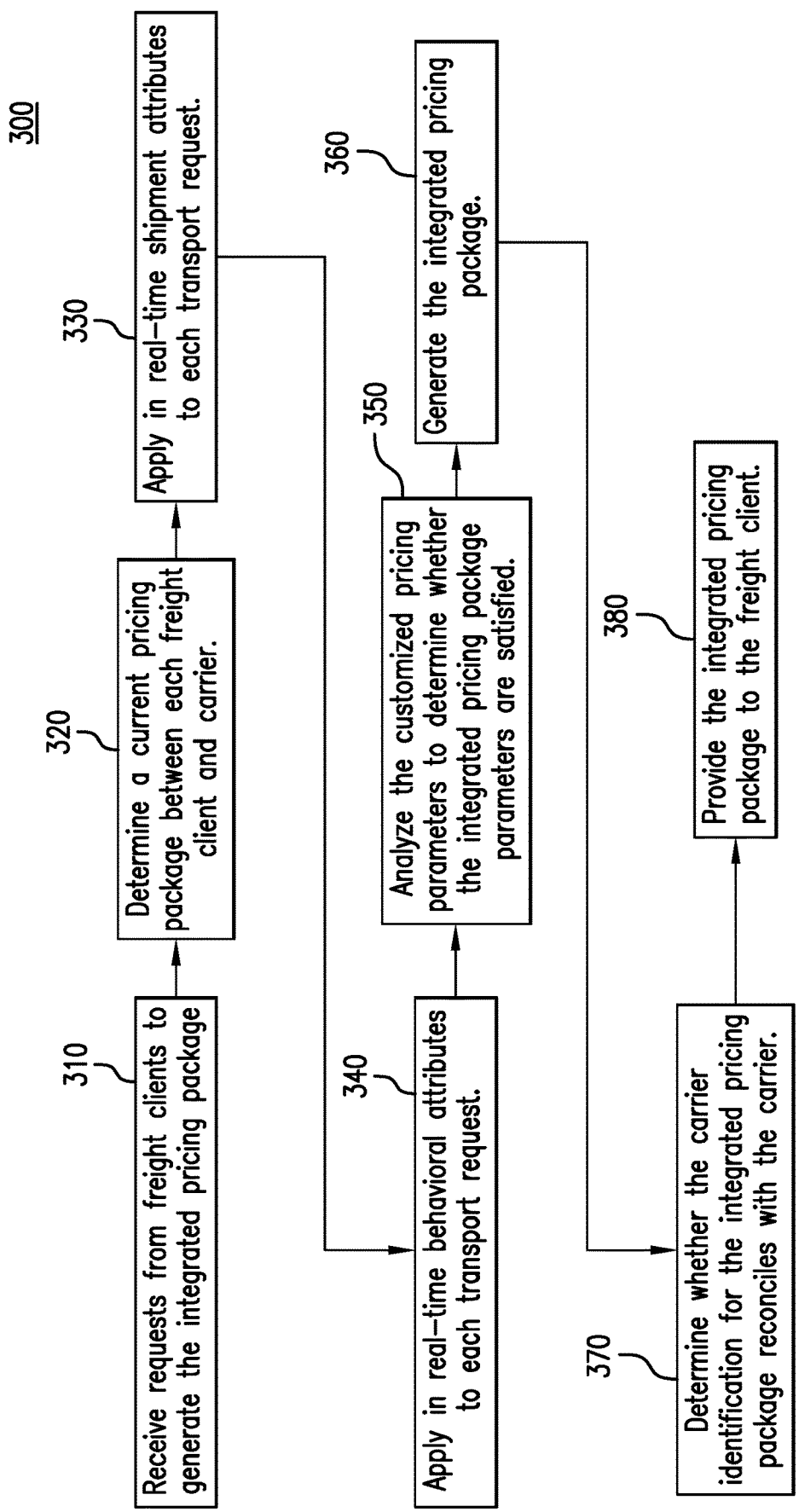
FIG. 3 is a flowchart showing an example method of providing an integrated pricing package.

One such implementation of providing an integrated pricing package is illustrated in process 300 in FIG. 3. Process 300 includes eight primary steps: receive requests from freight clients to generate the integrated pricing package 310, determine a current pricing package between each freight client and carrier 320, apply in real-time shipment attributes to each transport request 330, apply in real-time shipment attributes to each transport request 340, analyze the customized pricing parameters to determine whether the integrated pricing package parameters are satisfied 350, generate the integrated pricing package 360, determine whether the carrier identification for the integrated pricing package reconciles with the carrier 370, and provide the integrated pricing package to the freight client 380. Steps 310-380 are typically implemented in a computer, e.g., via software and/or hardware, e.g., intelligent pricing computing device 190.

In step 310, a plurality of requests from a plurality of freight client computing devices 140 to generate the integrated pricing package for each request may be received by intelligent pricing computing device 190. Numerous requests to transport freight shipments may be generated from numerous different freight client computing devices 140. With reach transport request, each freight client computing device 140 may also request a corresponding integrated pricing package for each transport request. Rather than have each of the numerous freight client computing devices 140 transmit each of the numerous transport requests to each individual carrier, the numerous transport requests may be transmitted to intelligent pricing computing device 190. Intelligent pricing computing device 190 may then provide each of the transport requests to the applicable carrier based on the attributes associated with each of the transport requests and the updated carrier attributes for each of the carriers.

Figure 4:
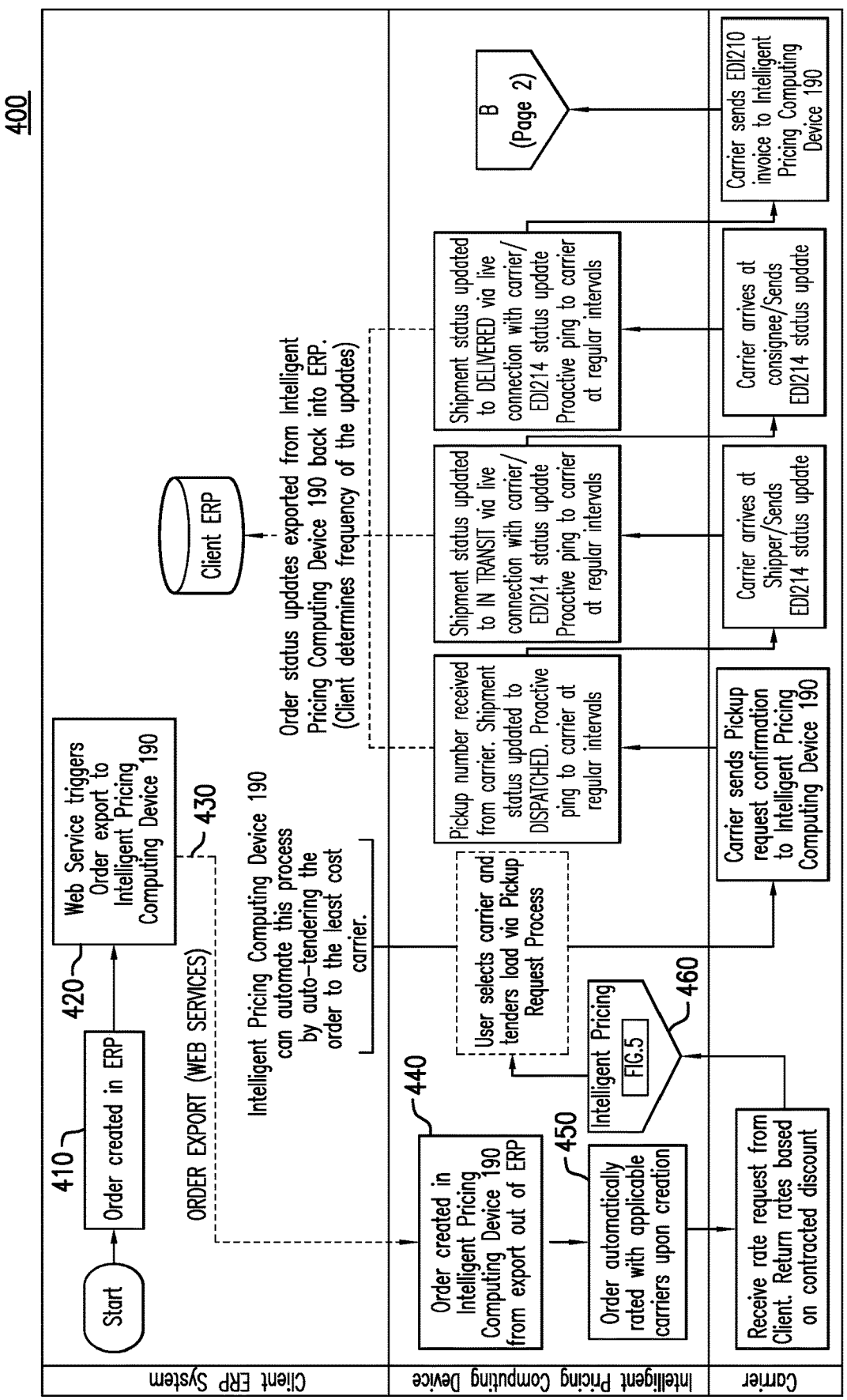
FIG. 4 is an example intelligent pricing system in which each of the numerous freight client computing devices may be implemented as a client enterprise resource planning (ERP) system.

In an embodiment as shown in intelligent pricing system 400 in FIG. 4, each of the numerous freight client computing devices 140 may be implemented as a client enterprise resource planning (ERP) system. In 410, the numerous requests to transport freight shipments may be generated by the client ERP system and a web service may then export the numerous requests in 420 to intelligent pricing computing device 190 via web services 430. The numerous transport requests from the numerous different client ERP systems may be exported to intelligent pricing computing device 190 in real-time and/or batched. The numerous transport requests generated by the numerous freight client computing devices 140 may be transmitted to intelligent pricing computing device 190 in any manner that will be apparent to those skilled in the relevant art(s) without departing from the spirit and scope of the present disclosure. In an example embodiment, step 310 may be performed by processor 195 of intelligent processing computing device 190 as shown in FIG. 1.

After the request is received, in step 320, intelligent pricing computing device 190 may determine a current pricing package that exists between each freight client and each carrier. The current pricing package is a standard pricing package between each freight client and each carrier and is not adjusted based on any customized pricing parameters that may be generated by intelligent pricing computing device 190. In an embodiment as shown in intelligent pricing system 400 in FIG. 4, an order may be generated by intelligent pricing computing device 190 for each of the transport requests received from each of the client ERP systems in 440. Intelligent pricing computing device 190 may then automatically determine a current pricing package that exists between each freight client and each carrier for each transport request. In an example embodiment, step 320 may be performed by processor 195 of intelligent processing computing device 190 as shown in FIG. 1.

In step 330, intelligent pricing computing device 190 may apply in real-time shipping attributes to each transport request. As noted above, intelligent pricing computing device 190 may update and analyze in real-time attributes associated with each of the numerous requests to transport freight shipments as well as update and analyze in real-time carrier attributes associated with each of the available transportation platforms for each of the numerous carriers. A specific carrier attribute that may be applied by intelligent pricing computing device 190 to each of the transport requests in customizing the transport requests to those transport requests that satisfy the carrier attributes is a shipment attribute. Shipment attributes may be associated with each of the different transportation platforms that are available for the carrier and provide a constraint to determine whether a freight shipment qualifies for an integrated pricing package. The shipment attribute may define the type of freight shipments that the carrier may request to transport as well as the pick-up location and/or delivery location of the freight shipments as well as the timing of when the freight shipments are to be transported.

For example, the carrier has an available transportation platform with shipment attributes that include the transportation platform being a truck, located in Cincinnati, is going to Pittsburgh in the next 24 hours, has 14 pallets of available space, and is a refrigeration truck. Each of these different shipment attributes provided constraints as to the requests to transport freight shipments that satisfy these different shipment attributes. In such an example, intelligent pricing computing device 190 may limit the freight shipments that satisfy the shipment attributes to requests that may be transported in a refrigerated truck, are located in Cincinnati, are to be transported to Pittsburgh, are available to be transported in the next 24 hours, and is 14 pallets or less. Shipment attributes may include but are not limited to date constraints such as pick-up date, delivery date, day of the week, week of the month, time constraints, zip code constraints such as 3 digit to 5 digit zip codes, city constraints, state constraints, dimensional constraints, weight constraints, packaging type constraints, class constraints, dimension constraints, density constraints, pallet quantity constraints, pricing constraints, geographical constraints, acute density constraints, hazmat constraints, accessorial constraints, special instruction constraints, whether the freight shipment may be transported through residential areas, head haul and/or back haul constraints, and/or any other type of shipment attribute that provides a constraint as to the transport requests of freight shipments that may be transported by the available transportation platforms of the carrier that will be apparent to those skilled in the relevant art(s) without departing from the spirit and scope of the present disclosure Intelligent pricing computing device 190 may update in real-time the shipment attributes associated with the carrier. As noted above, shipment attributes associated with available transportation platforms for the carrier may constantly fluctuate as the carrier utilizes the available transportation platforms to fulfill transport requests. For example, the carrier may have hundreds of different available transportation platforms at a given moment located in numerous different locations and the carrier may be allocating different available transportation platforms to fulfill transport requests as well as transportation platforms changing location and so on. Thus, intelligent pricing computing device 190 may update in real-time the shipment attributes associated with each of the available transportation platforms for the carrier in real-time such that the constraints as to which transport requests may be transported by the available transportation platforms of the carrier may be up to date as of the moment that carrier is determining whether to fulfill transport requests.

Intelligent pricing computing device 190 may then automatically apply in real-time each of the shipment attributes to each freight shipment as each freight shipment is requested by each freight client. As noted above, numerous transport requests may be submitted to intelligent pricing computing device 190. For the carrier to evaluate such numerous transport requests, such as hundreds of thousands of transport requests, in a short period of time to execute a decision to as to which transport requests to accept is not feasible. Intelligent pricing computing device 190 may automatically apply each of the shipment attributes to the numerous transport requests, such as hundreds of thousands of transport requests, in real-time such that the intelligent pricing computing device 190 may customize the transport requests that satisfy the shipment attributes for each specific available transportation platform for the carrier. In doing so, the transport requests may be streamlined and customized based on the current state of the shipment attributes of the available transportation platform as well as the current state of the transport requests that satisfy those shipment attributes and provided to the carrier for evaluation without any intervention by the carrier. Intelligent pricing computing device 190 may then determine in real-time whether each freight shipment qualifies for the corresponding integrated pricing package based on each of the shipment attributes.

For example, the shipment attributes may include the pick-up and/or delivery address data. The pick-up and/or delivery address data may include data that is associated with the geographic location of the pick-up location and/or the delivery location of the freight shipment. As noted above, the carrier may have numerous transportation platforms available at a time with each transportation platform located in a specific location and may be committed to a specific pick-up location to pick-up one or more freight shipments and/or a specific delivery location to deliver one or more freight shipments. Often times the freight shipments that the carrier commits to transport from a specific pick-up location and/or to a specific delivery location may not fully occupy the transportation platform, such as the truck transporting and/or picking up the freight shipments. Further, once the transportation platform, such as the truck, is located at a specific delivery location after a delivery is completed. In order for the transportation platform to return back to the original location and to be profitable in doing so, the carrier may request that a new transportation platform be generated so that the carrier may accept freight shipments to fill the truck so that the carrier may be profitable on the return trip back to the original location.

Intelligent pricing computing device 190 may evaluate transport requests to pick-up and/or deliver freight shipments based on the pick-up location and/or the delivery location of the freight shipments. Intelligent pricing computing device 190 may then filter the transport requests available to the carrier based on a radius of the pick-up location and/or delivery location of the freight shipments provided in the transport requests. The radius of the pick-up location and/or delivery location of the freight shipments may be the radius in which the carrier may travel to pick-up and/or deliver the freight shipments while still being profitable in doing so based on the current pick-up and/or delivery location that the truck is currently located. Intelligent pricing computing device 190 may select the transport requests that are within the radius of the pick-up location and/or delivery location of the freight shipments provided in the transport requests as transport requests that the carrier may consider as accepting due to the pick-up location and/or delivery location being within the radius in which the carrier may be profitable in travelling to pick-up and/or deliver the freight shipments of the transport requests. In doing so, intelligent pricing computing device 190 may incorporate the freight shipments that are within the radius of the current pick-up and/or delivery location that the truck is currently located as qualifying for the corresponding integrated pricing package.

The pick-up and/or delivery address data may include but is not limited to the 3 digit to 5 digit zip code of the pick-up and/or delivery location of the freight shipment, the city of the pick-up and/or delivery location of the freight shipment, the state of the pick-up and/or delivery location of the freight shipment and/or any other pick-up and/or delivery address data that may enable intelligent pricing computing device 190 to determine if the pick-up and/or delivery location of the freight shipment is within the radius of the current pick-up and/or delivery location of the truck that will be apparent to those skilled in the relevant art(s) without departing from the spirit and scope of the present disclosure.

For example, the carrier has an available transportation platform with shipment attributes that include the transportation platform being a truck, located in Cincinnati, is going to Pittsburgh in the next 24 hours, has 24 pallets of capacity but has committed to transport 10 pallets to Pittsburgh and thus has 14 pallets of available space, and is a refrigeration truck. Intelligent pricing computing device 190 may evaluate each of the available transport requests that require 14 pallets or less, a refrigeration truck, and a delivery location of Pittsburgh that are within a radius of the current location of the truck with 10 pallets committed for delivery to Pittsburgh in that the current location of the truck is in Cincinnati.

In such an example, intelligent pricing computing device 190 may evaluate each of the available transport requests to determine whether the current location of the freight shipments associated with each of the available transport requests are within 10 miles of the 5-digit zip code of 45242 which is the zip code of the current location of the truck in Cincinnati. Intelligent pricing computing device 190 may then filter the available transport requests to only include those available transport requests that are 14 pallets or less, require refrigeration, and have a pick-up location within 10 miles of the 5-digit zip code of 45242 as transport requests that the carrier may consider based on the pick-up location being within 10 miles of 5-digit zip code of 45242. In doing so, intelligent pricing computing device 190 may incorporate those corresponding freight shipments as qualifying for the corresponding integrated pricing package.

In another example, the shipment attributes may include whether the carrier is looking to allocate the transportation platform to a head haul or back haul. The head haul is when the carrier allocates the transportation platform to transport a freight shipment to a specific drop-off location. Often times the carrier may require that the freight shipment that the carrier commits the transportation platform to transport the freight shipment to the specific drop-off location be rated such that the cost of transporting the freight shipment is accommodated in the pricing to ensure that the carrier does not absorb a loss in committing the transportation platform to the specific drop-off location. Intelligent pricing computing device 190 may then filter whether the transportation platform of the carrier is available to be a head haul such that the integrated pricing package applied to the transport requests for the transportation platform that is available to be a head haul has a decreased discount applied to the transport request due the carrier requiring that the transportation platform available for the head haul to accommodate the cost of transporting the freight shipment as the head haul.

The back haul is when the carrier has already allocated the transportation platform to the head haul to deliver a freight shipment to a specific drop-off location and is requiring that the transportation platform return back to the original departure location. Since the carrier has already committed the transportation platform to the head haul to deliver the freight shipment to the specific drop-off location, the carrier may request to fill the transportation platform to as close to capacity as possible with freight shipments that are requested to be transported to the original departure location of the transport request. In doing so, the carrier may increase the profitability in returning the transportation platform back to the original departure location as much as possible by filling the transportation platform as close to capacity as possible with freight shipments since the carrier is returning the transportation platform back to the original departure location regardless of the freight shipments that are loaded onto the transportation platform on the back haul. Intelligent pricing computing device 190 may then filter whether the transportation platform of the carrier is committed to be a back haul such that the integrated pricing package applied to the transport requests for the transportation platform that is committed to be a back haul has an increased discount applied to the transport request to encourage freight clients to commit the freight shipments to the back haul such that the carrier may increase the profitability of the back haul.

For example, the carrier has an available transportation platform with shipment attributes that include the transportation platform being a truck, located in Cincinnati. The carrier has yet to commit the truck to transport any freight shipment to any specific delivery location and is thus available to be a head haul. The shipment attributes for the trunk also include 24 pallets of available space and is a refrigeration truck. Intelligent pricing computing device 190 may evaluate each of the available transport requests to determine whether the transport requests require 24 pallets or less of space and require refrigeration. Intelligent pricing computing device 190 may then filter whether the transportation platform of the carrier is available to be a head haul such that the integrated pricing package applied to the transport requests for the transportation platform that is available to be a head haul has a decreased discount applied to the transport request due the carrier requiring that the transportation platform available for the head haul to accommodate the cost of transporting the freight shipment as the head haul.

After the carrier commits the truck to transport freight shipments from Cincinnati to Pittsburgh and requires that the truck to return to Pittsburgh after delivering the freight shipments in Pittsburgh, the truck returning to Cincinnati from Pittsburgh becomes a back haul. Intelligent pricing computing device 190 may evaluate each of the available transport requests to determine whether the transport requests require 24 pallets or less of space, require refrigeration, and require a delivery location of Cincinnati in order to have the truck complete the back haul to Cincinnati. Intelligent pricing computing device 190 may then filter whether the transportation platform of the carrier is committed to being a back haul such that the integrated pricing package applied to the transport request that qualify the shipping attributes of requiring 24 pallets less of space, require refrigeration and require a delivery location of Cincinnati has an increased discount applied to the transport request to encourage the freight clients to commit the freight shipments to the back haul such that the carrier may increase the profitability of the back haul in returning the truck to Cincinnati.

Figure 5:
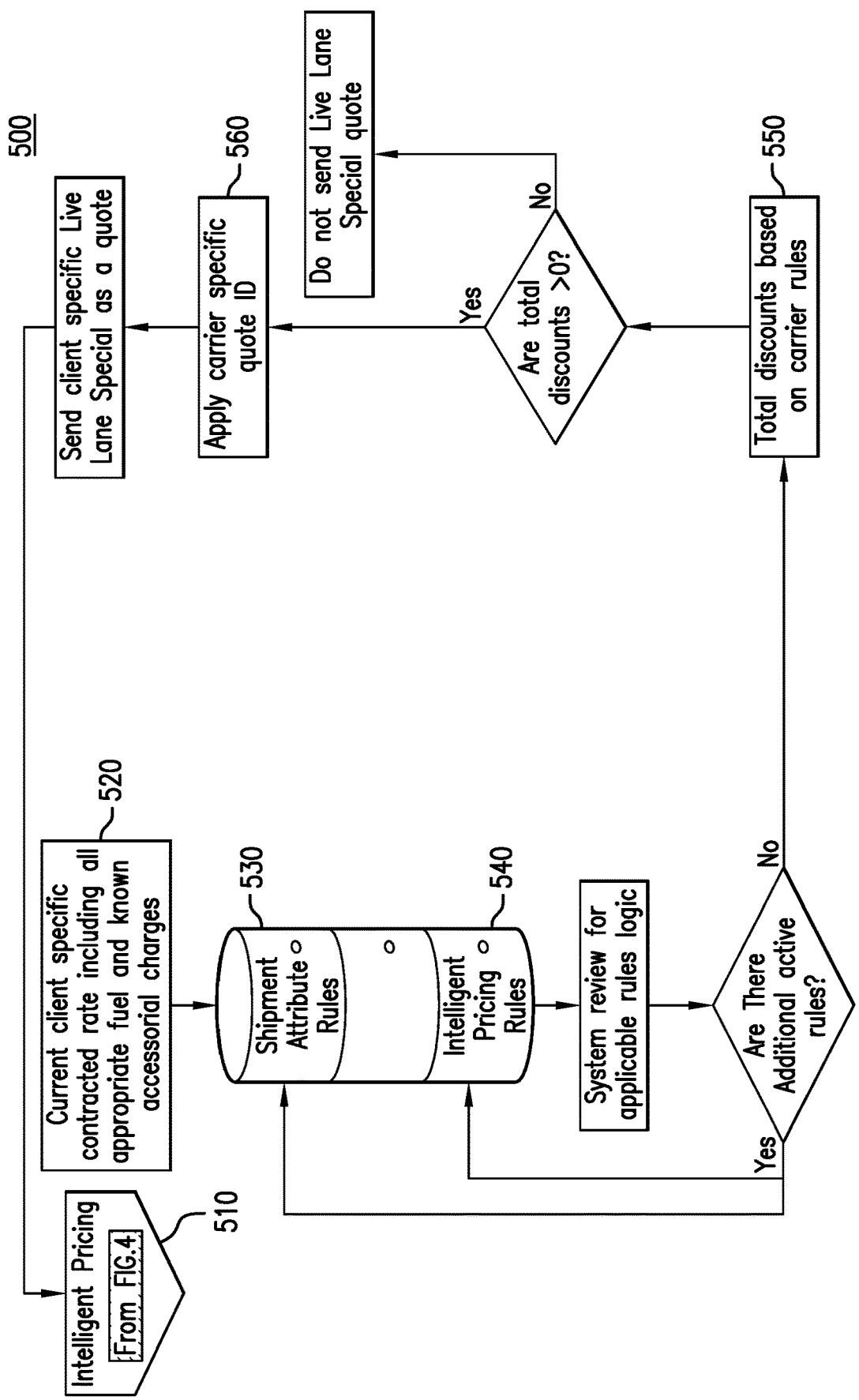
FIG. 5 is an example intelligent pricing system in which intelligent pricing computing device may inject intelligent pricing into the current pricing package that exists between each freight client and each carrier for each transport request.

In an embodiment as shown in intelligent pricing system 400 in FIG. 4, intelligent pricing computing device 190 may inject intelligent pricing into the current pricing package that exists between each freight client and each carrier for each transport request in 460 and is shown in more detail in intelligent pricing system 500 in FIG. 5. Intelligent pricing 510 may be injected into the current pricing package that exists between each freight client and each carrier for each transport request in 520. Specifically, each of the shipment attributes 530 may be applied to each of the transport requests to determine whether the transport requests satisfy the shipment attributes 530. In an example embodiment, step 330 may be performed by processor 195 of intelligent pricing computing device 190 as shown in FIG. 1.

In addition to applying each of the shipment attributes 530 to each of the transport requests to determine whether the transport requests satisfy the shipment attributes 530, intelligent processing computing device 190 may also apply rate attributes to each of the transport requests to determine whether the transport requests satisfy the rate attributes. Rate attributes may be associated with the pricing provided to different transport requests by the competitors of the carriers. The rate attributes may also be associated with the cost for transporting the freight shipment based on a specified attribute associated with the freight shipment such as the cost per pound and/or cost per mile to transport the freight shipment. The rate attributes may also be dynamically adjusted and independent of any current pricing package between the freight client and the carrier.

For example, the carrier has an available transportation platform with shipment attributes that include the transportation platform being a truck, located in Cincinnati, is going to Pittsburgh in the next 24 hours, has 14 pallets of available space, and is a refrigeration truck. The rate attributes that correspond to the shipment attributes may enable the carrier to adjust the pricing of transport requests based on the pricing that competitors of the carrier have offered for transportation platforms with similar shipment attributes as the available transportation platform of the competitor as well as adjust the rate based on the cost of transporting the freight. In such an example, intelligent pricing computing device 190 may adjust the integrated pricing package applied to the transport requests for the truck to incorporate the rate attributes. Rate attributes may include but are not limited to the least cost of a competitor, transit days that the freight shipment is to be transported, percentage and/or flat rate off of the least cost quote of a competitor, cost per pound/per mile to transport the freight shipment, dynamic tariffs applied to the freight client, and/or any other rate attribute that will be apparent to those skilled in the relevant art(s) without departing from the spirit and scope of the present disclosure.

Intelligent pricing computing device 190 may determine the rate at which each transport request provided by each freight client was awarded to the competitor of the carrier. As noted above, numerous transport requests may be generated by numerous freight clients. Of such numerous transport requests generated by numerous freight clients, a significant portion of the transport requests may not have been awarded to the carrier but to the competitors of the carrier. In being awarded to the competitors of the carrier, each of the competitors of the carrier was awarded the transport request based on a rate that the competitors of the carrier offered to the corresponding freight clients. Intelligent pricing computing device 190 may determine each rate that each of the transport requests was awarded to each of the corresponding competitors of the carrier and provide such rates to the carrier.

For example, the rate attributes may include the percentage and/or flat rate off the least cost quote. As noted above, numerous freight clients may generate numerous transport requests with a significant portion of the numerous transport requests being awarded to several different competitors of the carrier. Each of the numerous transport requests that were awarded to competitors of the carrier were done so at a rate that the competitor charged the corresponding freight client to transport the freight shipment associated with the transport request. Intelligent pricing computing device 190 may then determine the rate for each of the numerous transport requests that were awarded to different competitors of the carrier.

Intelligent pricing computing device 190 may then evaluate the rate for a transport request that was awarded to a competitor of the carrier and apply the rate attribute of the percentage and/or flat rate of the least cost quote. The percentage and/or flat rate of the least cost quote is a percentage and/or flat rate that intelligent pricing computing device 190 may apply to the rate for the transport request awarded to the carrier to determine the rate to integrate into the corresponding integrated pricing package for a transport request with shipment attributes similar to that of the transport request that was awarded to the competitor. Intelligent pricing computing device 190 may determine whether the current rate offered by the carrier for the transport request is within a rate threshold of the transport request with shipment attributes similar to that of the transport request that was awarded to the competitor.

The rate threshold is a difference in the current rate offered by the carrier for the transport request and the transport request with shipment attributes similar to that of the transport request that was awarded to the carrier. Intelligent pricing computing device 190 may then apply the percentage and/or flat rate to the least cost quote previously awarded to the competitor to generate the rate for the carrier to offer for the transport request with similar shipment attributes as the transport request previously awarded to the competitor. The current rate offered by the carrier for the transport request with shipment attributes similar to that of the transport request that was awarded to the carrier as being within the rate threshold is indicative that applying the percentage and/or flat rate to the least cost quote is a modest decrease in the rate offered by the carrier and may be a suitable approach to increase the likelihood that the freight client accepts the reduced rate offered by the carrier that is closer to the previous rate offered by the competitor while still being profitable to the carrier.

In doing so, intelligent pricing computing device 190 may apply a percentage and/or flat rate to the least cost quote offered by any of the competitors of the carrier that was previously awarded the transport request with similar attributes when the current rate offered by the carrier is within the rate threshold of the least cost quote offered by the any of the competitors. In an embodiment, intelligent pricing computing device 190 automatically apply a percentage to the least cost quote offered by any of the competitors to generate the current rate to be offered by the carrier for the transport request to ensure that the current rate is more competitive with the least cost quote offered by any of the competitors. In an embodiment, intelligent pricing computing device 190 may automatically apply a flat rate off of the least cost quote to generate the current rate to be offered by the carrier for the transport request to ensure that the current rate is more competitive with the least cost quote offered by any of the competitors. Intelligent pricing computing device 190 may then adjust the integrated pricing package for the transport request accordingly to incorporate the reduced rate offered for the transport request.

For example, the carrier has a current rate for a transport request that is within 9% of the least cost quote offered by the competitor for a transport request with similar attributes that was awarded to the competitor with the least cost quote. The rate threshold is 10%. In such an example, intelligent pricing computing device 190 may automatically apply a percentage to the least cost quote previously offered by the competitor to reduce the current rate for the transport request offered by the carrier to be more competitive with the least cost quote previously offered by the competitor since the current rate for the transport request is within 9% of the least cost quote previously offered by the carrier and is within the rate threshold of 10%. In such an example, intelligent pricing computing device 190 may automatically apply a flat rate off the least cost quote previously offered by the competitor to reduce the current rate for the transport request offered by the carrier to be more competitive with the least cost quote.

The rate attributes may also include whether the current rate offered by the carrier for the transport request is currently the least cost rate offered for the transport request. As noted above numerous freight clients may generate numerous transport requests with numerous competitors of the carrier also offering rates for the numerous transport requests. Intelligent pricing computing device 190 may determine the rates currently offered for the transport request by the numerous competitors of the carrier and determine whether the current rate offered by the carrier for the transport request is currently the least cost rate as compared to the rates offered by the numerous competitors for the transport request. Intelligent pricing computing device 190 may then refrain from reducing the current rate offered by the carrier for the transport request when the current rate is currently the least cost rate offered for the transport request as compared to the rates offered by the numerous competitors for the transport request as the current rate offered by the carrier is currently the lowest rate offered so reducing further is not necessary. Intelligent pricing computing device 190 may then determine whether the current rate is within the rate threshold of the least cost quote currently offered by the competitors when the current rate offered by the carrier for the transport request is not the least cost rate for the transport request.

Rate attributes may also include the cost per pound/per mile of the transport request. Intelligent pricing computing device 190 may determine the cost per pound and/or cost per mile for the transportation platform of the carrier to execute the transport request for the freight client. Each transport request may have a cost associated with the transport request that the carrier is to consume for the transportation platform to execute the transport request. Intelligent pricing computing device 190 may determine the cost associated with the transport request that is the carrier is to consume for the transportation platform to execute the transport request based on the weight of the freight shipment and/or the distance that the freight shipment is to be transported. In doing so, intelligent pricing computing device 190 may determine a cost per pound that the carrier is to consume to transport the freight shipment of the transport request based on the weight of the freight shipment and/or determine a cost per mile that the carrier is to consume to transport the freight shipment of the transport request based on the distance that the freight shipment is to be transported.

Intelligent pricing computing device 190 may then determine whether the transport request satisfies a cost threshold. The cost threshold is a percentage of the cost consumed by the carrier to transport the freight shipment relative to the rate to be offered by the carrier to transport the freight shipment. Intelligent pricing computing device 190 may reduce the rate to be offered by the carrier to transport the freight shipment when the cost per pound and/or cost per mile is below the cost threshold as the cost consumed by the carrier is decreased sufficiently that the carrier is to be profitable in transporting the transport request and may afford to decrease the rate offered for the transport request further while still being profitable in transporting the transport request. However, intelligent pricing computing device 190 may refrain from reducing the rate offered by the carrier to transport the freight shipment when the cost per pound and/or cost per mile is above the cost threshold as the cost consumed by the carrier is not decreased sufficiently triggering the carrier to have a reduced profitability in transporting the freight shipment and may not sustain a decrease in the rate offered for the transport request.

For example, intelligent pricing computing device 190 may determine that the cost per pound to transport the freight shipment of the transport request triggers a cost that is consumed by the carrier to transport the freight shipment that is 90% of the current rate offered by the carrier for the transport request. The cost threshold is 92% such that 90% is below the cost threshold. Intelligent pricing computing device 190 may then reduce the current rate offered by the carrier for the transport request to lower the current rate such that the cost consumed by the carrier to transport the freight shipment increases from 90% to 92%. In doing so, the carrier still operates with 8% profitability in transporting the freight shipment but may reduce the current rate offered for the transport request to further incentivize the freight client to use the carrier. In another example, intelligent pricing computing device 190 may determine that the cost per mile to transport the freight shipment of the transport request triggers a cost that consumed by the carrier to transport the freight shipment that is 94% of the current rate offered by the carrier for the transport request. The 94% is above the cost threshold of 92%. Intelligent pricing computing device 190 may then refrain from reducing the current rate offered by the carrier for the transport request as the carrier is already operating at 6% profitability in transporting the freight shipment and cannot afford to further reduce the current rate offered to reduce the profitability in transporting the freight shipment even further.

Rate attributes may also include the transit days that the freight shipment of the transport request is to be transported. The amount of transit days that the freight shipment of the transport request is to be transported may increase the cost consumed by the carrier to transport the freight shipment. The greater amount of transit days that the freight shipment of the transport request is to be transported, the greater amount of time the driver is to commit to the transporting the freight shipment thereby increasing the cost of the driver to transport the freight shipment, the increased amount of fuel consumed by the transport platform, the increased wear and tear on the transportation platform and so on. Thus, as the lesser amount of transit days that the freight shipment of the transport request is to be transported decreases the cost consumed by the carrier to transport the freight shipment.

Intelligent pricing computing device 190 may then determine whether the transport request satisfies a transit threshold. The transit threshold is the amount of transit days that when above may significantly increase the cost consumed by the carrier to transport the freight shipment of the transport request and when below decreases the cost consumed by the carrier to transport the freight shipment of the transport request. Intelligent pricing computing device 190 may reduce the rate to be offered by the carrier to transport the freight shipment when the amount of transit days is below the transit threshold as the cost consumed by the carrier is decreased sufficiently that the carrier is to be profitable in transporting the transport request and may afford to decrease the rate offered for the transport request further while still being profitable in transporting the transport request. However, intelligent pricing computing device 190 my refrain from reducing the rate offered by the carrier to transport the freight shipment when the amount of transit days is above the transit threshold as the cost consumed by the carrier is not decreased sufficiently triggering the carrier to have a reduced profitability in transporting the freight shipment of the transport request and may not sustain a decrease in the rate offered for the transport request.

For example, intelligent pricing computing device 190 may determine that the transit threshold is 2 days. The transit days required to transport the freight shipment of the transport request is 1 day which is below the transit threshold of 2 days. Intelligent pricing computing device 190 may reduce the current rate offered by the carrier for the transport request to lower the current rate. In doing so, the carrier still operates with sufficient profitability due to the decreased cost consumed by the carrier in transporting the freight shipment of the transport request in 1 day and may reduce the current rate offered for the transport request to further incentivize the freight client to use the carrier. In another example, the transit days required to transport the freight shipment of the transport request is 3 days which is above the transit threshold of 2 days. Intelligent pricing computing device 190 may then refrain from reducing the current rate offered by the carrier for the transport request as the carrier is already consuming an increase in cost due to the amount of transit days to transport the freight shipment of the transport request being 3 days and cannot afford to further reduce the current rate offered to reduce the profitability in transporting the freight shipment even further.

Rate attributes also include dynamic tariffs that may be applied to the transport requests of a specific freight client. Specific freight clients may have poor performance with regard to the relationship with the carrier and the carrier may request the flexibility to increase and/or decrease the rates that are offered to the transport requests of the poorly acting freight clients. Rather than automatically adjust the current rate offered to the freight clients based on the rate attributes, shipment attributes and so on, intelligent pricing computing device 190 may instead dynamically adjust the rates offered to the poorly acting freight clients based on the behavior of the poorly acting freight clients. In doing so, the dynamic adjustment of rates by intelligent pricing computing device 190 is not based off of a contracted rate with the poorly acting freight clients but is rather simply based off of the behavior of the poorly acting freight clients. As the behavior of the poorly acting freight clients improves, intelligent pricing computing device 190 may automatically reduce the rates offered to the poorly acting freight clients for transport requests. As the behavior of the poorly acting freight clients worsens, intelligent pricing computing device 190 may automatically increase the rates offered to the poorly acting freight clients for transport requests.

In step 340, intelligent pricing computing device 190 may apply in real-time behavioral attributes to each transport request. As noted above, intelligent pricing computing device 190 may update and analyze in real-time attributes associated with each of the numerous requests to transport freight shipments as well as update and analyze in real-time carrier attributes associated with each of the available transportation platforms for each of the numerous carriers. A specific attribute that may be applied by intelligent pricing computing device 190 to each of the transport requests to further customize the pricing parameters for each transport request is a behavioral attribute. Behavioral attributes may be associated with past behavior of the freight client engaging the carrier and enable intelligent pricing computing device 190 to further customize the pricing parameters for each transport request based on the past behavior of the freight client with the carrier.

The behavioral attributes associated with past behavior between the freight client and the carrier may enable the carrier to further incentivize freight clients to utilize their available transportation platforms. The behavioral attributes may provide insight as to the frequency in which the freight clients utilize the available transportation platforms of the carrier and may be customized to the actual available transportation platform. For example, intelligent pricing computing device 190 may identify behavioral attributes such as the amount of days that have lapsed since the freight client has utilized the available transportation platform between Cincinnati and Pittsburgh and thus offer an additional discount to entice the fright client to utilize the available transportation platform between Cincinnati and Pittsburgh. In doing so, intelligent pricing computing device 190 may identify behavioral attributes such as the overall amount of usage and frequency that a freight client engages a carrier but also the overall amount of usage and frequency that a freight client engages an actual available transportation platform. The behavioral attribute may define the type of freight client that the carrier may request to engage in fulfilling transport requests from.

The behavioral attributes may also include the current pricing parameters that other carriers are offering for a specific available transportation platform and thus provide insight as to the current pricing parameters that the competition to the carrier is offering to transport requests to utilize similar transportation platforms. For example, intelligent pricing computing device 190 may identify behavioral attributes such as the current rate that other carriers are offering to fulfill transport requests of Cincinnati to Pittsburgh in the next 24 hours and thus offer an additional discount to be less than the current rates of the other carriers to entice the freight client to utilize the transportation platform of the carrier as opposed to that of the competing carriers. Behavioral attributes may include but are not limited to overall frequency that a freight client engages a carrier, overall usage that a freight client engages a carrier, overall fees that a freight client pays to a carrier for transporting freight shipments, frequency that a freight client engages a specific transportation platform of a carrier, overall usage that the freight client engages the specific transportation platform of a carrier, fees that a freight client pays to a carrier for transporting freight shipments via the specific transportation platform, the current pricing parameters that other carriers are offering to utilize similar transportation platforms, load density at pick-up, load density at delivery, line haul discounts based on geography, payment terms/payment history, account activity, seasonal pricing, lane pricing by operating ratio, agent vs. shipper vs. third party logistics (3PLs), number of damage claims, number of missed pick-ups, number of reclassifications and/or any other type of behavioral attribute to further customize the pricing parameters for a request to transport freight shipments by a freight client that will be apparent to those skilled in the relevant art(s) without departing from the spirit and scope of the present disclosure.

Intelligent pricing computing device 190 may update in real-time the behavioral attributes associated with the carrier so that the past behavior of each freight client engaging the carrier is up to date in real-time. As noted above, an immense amount of transport requests may be submitted by an immense amount of freight clients to have fulfilled by an immense amount of carriers. A specific carrier may fulfill numerous transport requests for a specific freight client in a given time period and the frequency in fulfilling those transport requests may be quite significant. For example, the carrier may fulfill several transport requests utilizing the transportation platform of a truck transferring freight shipments from Cincinnati to Pittsburgh in a given day, week, month, year and so on. Further numerous carriers may also be offering pricing parameters to execute transport requests for similar transportation platforms and those pricing parameters that are offered may be constantly fluctuating. For example, other competing carriers may be offering pricing parameters that $3, $5, $10 apart from each other to transport freight shipments by truck from Cincinnati to Pittsburgh and those pricing parameters may be fluctuating constantly as the availability of the trucks from Cincinnati to Pittsburgh for those competing carriers change. Thus, intelligent pricing computing device 190 may update in real-time the behavioral parameters such that the prior behavior between each freight client and the carrier as well as the current behavioral parameters of other carriers with regard to similar transportation platforms may be up to date as of the moment that the carrier is determining whether to fulfill transport requests.

Intelligent pricing computing device 190 may then automatically apply in real-time the shipment attributes to each freight shipment as each freight shipment is requested by each freight client. As noted above, past behavior between freight clients and the carrier may be occurring often and may even occur right before the moment that the carrier is to determine whether to fulfill transport requests as well as the pricing parameters offered by competing carriers for similar transportation platforms constantly fluctuating. Intelligent pricing computing device 190 may automatically apply each of the behavioral attributes to the numerous transport requests in real-time such that intelligent pricing computing device 190 may further customize pricing parameters for each freight client based on the updated past behavior between the carrier and the freight client as well as the updated pricing parameters offered by competing carriers. Intelligent pricing computing device 190 may then provide each integrated pricing package to each freight client that incorporates the customized pricing parameters that are customized based on the past behavior between each freight client and the carrier.

In an embodiment, an example of behavioral attributes may include the load density associated with a freight client. The load density is the threshold of freight shipments that the carrier is to execute for a specific location in a period of time in order to be profitable. For example, the load density for a freight client may be 4.5 in that the carrier is required to transport 4.5 or more freight shipments to be profitable. Intelligent pricing computing device 190 may then determine a customized pricing parameter of an increased discount for each transport request that exceeds the load density of 4.5 from Cincinnati to Pittsburgh. Intelligent pricing computing device 190 may also incorporate the frequency of transport requests over a period of time into the customized pricing parameter. For example, the load density for a freight client from Cincinnati to Pittsburgh may be a factor or 4.5 in that the carrier is required to transport 4.5 or more freight shipments from Cincinnati to Pittsburgh over a 7-day period to be profitable. Intelligent pricing computing device 190 may then determine a customized pricing parameter of an increased discount when the freight client has transport requests that exceed 4.5 transport requests over a 7-day period. Intelligent pricing computing device 190 may also refrain from applying a customized pricing parameter to the first transport request for a location as there is decreased incentive for the carrier to transport the freight request at a discount for the first transport request but would then apply customized pricing parameters for each transport request following the first transport request that the carrier commits to.

For example, the behavioral attributes may include the payment terms/payment history of the freight client. The payment terms/payment history of the freight client may include whether the freight client consistently pays their bills from the carrier on-time as well as the payment terms of the agreement between the carrier and the freight client. Intelligent pricing computing device 190 may evaluate the payment history of the freight client and determine whether the payment history of the client is above a payment threshold. The payment threshold is the amount of payments to the carrier that have been missed and/or late by the freight client to the carrier. Intelligent pricing computing device 190 may reduce the rate to be offered by the carrier to transport the freight shipments of the transport requests requested by the freight client when the amount of missed and/or late payments from the freight client to the carrier are below the payment threshold to reward the freight client for making their payments to the carrier promptly. However, intelligent pricing computing device 190 may refrain from reducing the rate offered by the carrier to transport the freight shipments of the transport requests requested by the freight client when the amount of missed and/or late payments from the freight client to the carrier are above the payment threshold to penalize the freight client for failing to make their payments to the carrier promptly.

Behavioral attributes may also include the agent versus shipper versus 3PL that determines the type of freight client that the freight client is classified. Intelligent pricing computing device 190 may classify the freight client as an agent, a shipper, and/or a 3PL. Based on the classification, intelligent processing computing device 190 may determine whether to reduce the current rate offered by the carrier to the freight client. For example, the carrier may already be compensating the freight client that is the agent with a commission and therefore intelligent pricing computing device 190 may refrain from decreasing the current rate offered to the agent by the carrier. In another example, the carrier may want to obtain as many transport requests as possible from the freight clients that are shippers as shippers provide the most profitable transport requests and therefore intelligent pricing computing device 190 may decrease the current rate offered to the shippers by the carrier. In another example, the carrier competes heavily with 3PLs who also attempt to pursue shippers for transport requests and based on the competition with 3PLs the carrier may not want to provide any decrease in the current rates with the 3PLs and therefore intelligent pricing computing device 190 may refrain from decreasing the current offered to the 3PLs by the carrier.

Behavioral attributes may also include the lane pricing by operating ratio of the transport request. Intelligent pricing computing device 190 may determine the operating ratio for the transportation platform of the carrier to execute the transport request for the freight client. Each transport request may have a cost associated with the transport request that the carrier is to consume for the transportation platform to execute the transport request. Intelligent pricing computing device 190 may determine the cost associated with the transport request that is the carrier is consume for the transportation platform to execute the transport request. In doing so, intelligent pricing computing device 190 may determine a cost that the carrier is to consume to transport the freight shipment of the transport request and determine an operating ratio for the transport request in that the operating ratio is the percentage of the rate that is charged to the freight client to transport the freight shipment of the transport request that is consumed as cost by the carrier.

Intelligent pricing computing device 190 may then determine whether the transport request satisfies the cost threshold. Intelligent pricing computing device 190 may reduce the rate to be offered by the carrier to transport the freight shipment when the operating ratio is below the cost threshold as the cost consumed by the carrier is decreased sufficiently that the carrier is to be profitable in transporting the transport request and may afford to decrease the rate offered for the transport request further while still being profitable in transporting the transport request. However, intelligent pricing computing device 190 may refrain from reducing the rate offered by the carrier to transport the freight shipment when the operating ratio is above the cost threshold as the cost consumed by the carrier is not decreased sufficiently triggering the carrier to have a reduced profitability in transporting the transport request and may not sustain a decrease in the rate offered for the transport request.

In an embodiment, intelligent pricing computing device 190 may determine the operating ratio based on the zip code of the destination that the freight shipment of the transport request is to be transported. Specific destination locations may have significantly different operating ratios. For example, the transporting of the freight shipment between Cincinnati and Pittsburgh may have a decreased operating ratio in that there is decreased cost for the carrier associated with transporting the freight shipment from Cincinnati to Pittsburgh due to the geographic locations of Cincinnati and Pittsburgh as well as an increased opportunity to load the transportation platform on the back haul from Pittsburgh due to Pittsburgh having an increased amount of manufacturing. In doing so, the carrier has decreased cost consumed when transporting the freight shipment from Cincinnati to Pittsburgh and thus has an increased profitability when transporting the freight shipment from Cincinnati to Pittsburgh.

In another example, the transporting of the freight shipment between Cincinnati and Denver may have an increased operating ratio in that there is increased cost for the carrier associated with transporting the freight shipment from Cincinnati to Denver due to the geographic locations of Cincinnati and Denver as well as a decreased opportunity to load the transportation platform on the back haul from Denver due to Denver having a decreased amount of manufacturing and being remote from other cities. In doing so, the carrier has increased cost consumed when transporting the freight shipment from Cincinnati to Denver and thus has a decreased profitability when transporting the freight shipment from Cincinnati to Denver.

For example, intelligent pricing computing device 190 may determine that the operating ratio to transport the freight shipment of the transport request from Cincinnati to Pittsburgh based on the zip code of Pittsburgh triggers a cost that is consumed by the carrier to transport the freight shipment that is 85% of the current rate offered by the carrier for the transport request. The cost threshold is 90% such that 85% is significantly below the cost threshold. Intelligent pricing computing device 190 may then reduce the current rate offered by the carrier for the transport request to lower the current rate such that the cost consumed by the carrier to transport the freight shipment from Cincinnati to Pittsburgh increases from 85% to 90%. In doing so, the carrier still operates with 10% profitability in transporting the freight shipment but may reduce the current rate offered for the transport request from Cincinnati to Pittsburgh to further incentivize the freight client to use the carrier.

In another example, intelligent pricing computing device 190 may determine that the operating ratio to transport the freight shipment of the transport request from Cincinnati to Denver based on the zip code of Denver triggers a cost that is consumed by the carrier to transport the freight shipment that is 96% of the current rate offered by the carrier for the transport request. The 96% is above the cost threshold of 92%. Intelligent pricing computing device 190 may then refrain from reducing the current rate offered by the carrier for the transport request as the carrier is already operating at 4% profitability in transporting the freight shipment and cannot afford to further reduce the current rate offered to reduce the profitability in transporting the freight shipment even further.

Behavioral attributes may also include the quantity of damage claims associated with the freight client. The damage claims that freight clients declare originate from any type of damage to the freight shipment from when the transportation platform of the carrier initially picked up the freight shipment at the pick-up location and then delivered the freight shipment to the delivery location. After the freight shipment is delivered at the delivery location, the freight client may evaluate the freight shipment to determine if there is any damage to the freight shipment. If there is such damage determined by the freight client, the freight client may initiate a damage claim which indicates to the carrier the amount of damage that occurred during the transport of the freight shipment such that the carrier is liable for such damage to the freight shipment. Such an evaluation of damage to the freight shipment by the freight client triggering the carrier to be liable is a subjective operation based purely on the subjective evaluation by the freight client. Thus, whether damage did occur as well as the cost estimation of the damage that the carrier is liable for is based on the subjective evaluation of the freight client.

Intelligent pricing computing device 190 may then determine whether the quantity of damage claims reported by a freight client satisfies a damage claim threshold. The damage claim threshold is the amount of damage claims that when above may result in such an increase in cost consumed by the carrier to transport the freight shipments for the freight client that based on the cost consumed by the carrier to accommodate the freight claims reported by the freight client that the profitability of transporting freight shipments for the freight carrier is significantly decreased. Intelligent pricing computing device 190 may reduce the rate to be offered by the carrier to transport freight shipments for the freight client when the amount of damage claims is below the damage claim threshold. However, intelligent pricing computing device 190 may refrain from reducing the rate offered by the carrier to transport the freight shipment when the quantity of damage claims is above the damage claim threshold as the cost consumed by the carrier for damage claims reported by the client is increased that reduces profitability in transporting freight shipments for the freight client and may not sustain a decrease in the rate offered for the transport request.

Behavioral attributes may also include the quantity reclassifications associated with the freight client. Each freight shipment that a freight client generates a transport request for indicates the classification of the freight shipment. Each freight shipment is classified based on the ease and/or favorability to be transported by the transportation platform of the carrier. The increase in ease and/or favorability decreases the cost that is consumed by the carrier to transport the freight shipment while the difficulty and/or lack of favorability increases the cost that is consumed by the carrier to transport the freight shipment. Intelligent pricing computing device 190 may then determine the rate to transport the freight shipment for the freight client based on the classification provided by the freight client. A classification of the freight shipment that has an increase in ease and/or favorability may trigger intelligent pricing computing device 190 to generate a decreased rate for the freight shipment as the ease and/or favorability of the freight shipment decreases the cost that is consumed by the carrier thereby enabling the carrier to sustain a decreased rate to transport the freight shipment. However, a classification of the freight shipment that has an increase in difficulty and/or lack of favorability may trigger intelligent pricing computing device 190 to generate an increased rate for the freight shipment as the difficulty and/or lack of favorability of the freight shipment increases the cost that is consumed by the carrier thereby preventing the carrier from sustaining a decreased rate to transport the freight shipment.

Often times, the freight client may misclassify the freight shipment either intentionally and/or unintentionally. Each time that the freight shipment is misclassified by the freight client, intelligent pricing computing device 190 may generate a decreased rate for the freight shipment that has been misclassified by the freight client as being of increased ease and/or favorability. However, after transporting the freight shipment, the proper classification of the freight shipment is actually of increased difficulty and/or lack of favorability and therefore triggered an increased cost consumed by the carrier triggering a significant decrease in profitability for the carrier as the freight client was incorrectly offered a decreased rate due to the misclassification of the freight shipment provided by the freight client.

Intelligent pricing computing device 190 may then determine whether the reclassification of freight shipments for a freight client satisfies a reclassification threshold. The reclassification threshold is the amount of reclassifications that when above may result in an increase cost consumed by the carrier to transport the freight shipments for the freight client based on the cost consumed by the carrier to accommodate the misclassifications provided by the freight client that the profitability of transporting freight shipments for the freight carrier is significantly decreased. Intelligent pricing computing device 190 may reduce the rate offered by the carrier to transport freight shipments for the freight client when the amount of reclassifications is below the reclassification threshold. However, intelligent pricing computing device 190 may refrain from reducing the rate offered by the carrier to transport the freight shipment when the quantity of reclassifications is above the reclassification threshold as the cost consumed by the carrier for misclassifications reported by the freight client is increased that reduces the profitability in transporting freight shipments for the freight client and may not sustain a decrease in the rate offered for the transport request.

In an embodiment, intelligent pricing computing device 190 may determine a value for each of the behavioral attributes in which the value is related to whether the behavioral attribute for a specific freight client is favorable to the carrier or unfavorable. Intelligent pricing computing device 190 may then automatically adjust the rate that is generated for the freight client based on the value for each behavioral attribute that is determined by intelligent pricing computing device 190. For example, intelligent pricing computing device 190 may automatically adjust the rate that is generated for the freight client based on the reclassification of freight shipments behavioral attribute of the freight client. Depending on whether the reclassification of freight shipment behavioral attribute for the freight client positively and/or negatively impacts the cost absorbed by the carrier for transporting freight shipments for the freight client based on reclassification, intelligent pricing computing device 190 may determine the value of the reclassification of freight shipment accordingly for the freight client. Intelligent pricing computing device 190 may then automatically adjust the rate for the freight client based on the value for the reclassification of freight shipment attribute for the freight client.

In an embodiment as shown in intelligent pricing system 500 in FIG. 5, each of the behavioral attributes 540 may be applied to each of the transport requests to determine whether each of the transport requests qualify for customized pricing parameters based on the behavioral attributes 540. In an example embodiment, step 340 may be performed by processor 195 of intelligent pricing computing device 190 as shown in FIG. 1.

In addition to applying each of behavioral attributes 540 to each of the transport requests to determine whether the transport requests satisfy behavioral attributes 540, intelligent processing computing device 190 may also apply shipper location attributes. Shipper location attributes may be associated with the location that the freight client requests to have the freight shipment shipped and/or delivered. For example, the freight client has a transport request such that requires that the freight shipment be delivered to a college campus by a semi-truck and trailer. The shipper location attributes may enable the carrier to adjust the pricing of transport requests based on the location that the freight shipment is to be delivered. In such an example, intelligent pricing computing device 190 may adjust the integrated pricing package applied to the transport requests for the semi-truck and trailer to incorporate the shipper location attributes. Shipper location attributes may include but are not limited to the each of access and/or limited access, distance from the terminal, historical detention times, pick-up time and/or any other shipper location attribute that will be apparent to those skilled in the relevant art(s) without departing from the spirit and scope of the present disclosure.

For example, shipper location attributes may include the historical detention time that is associated with the location of the freight client that the freight shipment is to be delivered. Each freight shipment is to be delivered to a location. The decrease in the amount of time that the transportation platform is detained at the delivery location after the transport request arrives at the delivery location to deliver the freight shipment decreases the cost that is consumed by the carrier to transport the freight shipment while the increase in the amount of time that the transportation platform is detained at the delivery location increases the cost that is consumed by the carrier to transport the freight shipment. Intelligent pricing computing device 190 may then determine the rate to transport the freight shipment for the freight client based on the amount of time that the transportation platform is historically detained at the delivery location. A delivery location that has a decrease in the amount of detention time may trigger intelligent pricing computing device 190 to generate a decreased rate for the freight shipment as the decreased amount of time that the transportation platform is detained at the delivery location decreases the cost that is consumed by the carrier thereby enabling the carrier to sustain a decreased rate to transport the freight shipment. However, a delivery location with historical increased detention times may trigger intelligent pricing computing device 190 to generate an increased rate for the freight shipment as the increased amount of detention time increases the cost that is consumed by the carrier thereby preventing the carrier from sustaining a decreased rate to transport the freight shipment.

For example, shipper location attributes may also include the pick-up time that is associated with the time during the day that the freight client requests that the freight shipment is to be picked-up at the pick-up location. The later in the business day that the transportation platform is to pick-up the freight shipment the more difficult for the carrier to utilize the transportation platform for transporting other transport requests for other freight shipments. In doing so, the transportation platform is essentially committed exclusively to the transportation of the freight shipment that is scheduled later in the business day due to the lack of flexibility in the day to commit the transportation platform to transporting other freight shipments. The earlier in the business day that the freight shipment is available to be picked-up increases the likelihood that the transportation platform may be committed to transporting additional freight shipments of additional transport requests.

Intelligent pricing computing device 190 may then determine the rate to transport the freight shipment for the freight client based on the time during the business day that the freight shipment is to be picked up. A pick-up time that is scheduled earlier in the business day has an increased likelihood that the transportation platform may be committed to the transport of additional freight shipments of additional transport requests and may trigger intelligent pricing computing device 190 to generate a decreased rate for the freight shipment as the likelihood that the transportation platform may be committed to transporting additional freight shipments increases. However, a pick-up time that is scheduled later in the business day decreases the likelihood that the transportation platform may be committed to transporting additional freight shipments for additional transport requests and may trigger intelligent pricing computing device 190 to generate an increased rate for the freight shipment as the likelihood that the transportation platform may be committed to transporting additional freight shipments decreases.

In an embodiment, intelligent pricing computing device 190 may determine a value for each of the shipper location attributes in which the value is related to whether the shipper location attribute for a specific freight client is favorable to the carrier or unfavorable. Intelligent pricing computing device 190 may then automatically adjust the rate that is generated for the freight client based on the value for each shipper location attribute that is determined by intelligent pricing computing device 190. For example, intelligent pricing computing device 190 may automatically adjust the rate that is generated for the freight client based on the pick-up time of the freight shipment attribute of the freight client. Depending on whether the pick-up time of the shipper location attribute for the freight client positively and/or negatively impacts the cost absorbed by the carrier for transporting freight shipments for the freight client based on pick-up time, intelligent pricing computing device 190 may determine the value of the pick-up time of the freight shipment accordingly for the freight client. Intelligent pricing computing device 190 may then automatically adjust the rate for the freight client based on the value of the pick-up time of the freight shipment attribute for the freight client.

After the shipment attributes and the behavioral attributes have been applied to each transport request, in step 350, intelligent pricing computing device 190 may analyze the customized pricing parameters to determine whether the integrated pricing package parameters are satisfied. Each of the requests to transport freight shipments may satisfy multiple shipment attributes and behavioral attributes. However, generating customized pricing parameters for the transport request that incorporates each of the different shipment attributes and behavioral attributes that are satisfied by the transport request may result in an integrated pricing package for the transport request that is not beneficial to the carrier if the carrier were to execute the transport request with the integrated pricing package. For example, the transport request in satisfying multiple shipment attributes and behavioral attributes may qualify for multiple different discounts. However, in offering an integrated pricing package to execute the transport request that incorporates the multiple discounts may result in the carrier having a significant decrease in profitability in executing the transport request due to the multiple discounts.

Intelligent pricing computing device 190 may assess customized pricing parameters that are generated for each freight shipment to determine whether the customized pricing parameters satisfy an integrated pricing package threshold for each freight shipment such that intelligent pricing computing device 190 may prevent the integrated pricing package from decreasing below the integrated pricing package threshold. The integrated pricing package threshold is a threshold in which the integrated pricing package that incorporates the customized pricing parameters is to satisfy in order for the execution of the transport request by the carrier to be worthwhile. An integrated pricing package that includes customized pricing parameters that exceed the integrated pricing package threshold may be worthwhile for the carrier to execute the transport request based on the integrated pricing package. An integrated pricing package that includes customized pricing parameters that fall below the integrated pricing package threshold may not be worthwhile for the carrier to execute the transport request based on the integrated pricing package.

For example, a transport request satisfies the shipment attribute of having to be transported from Cincinnati to Pittsburgh and qualifies for the customized pricing parameter of a 3% discount and also satisfies the behavioral attribute of being the second shipment of the day that the carrier may transport for the freight client and qualifies for a 2% discount. An integrated pricing package that includes both the 2% discount and the 3% discount may result in falling below the integrated pricing package threshold in that the carrier may have a significantly decreased profit if the carrier executes the transport request with the both the 3% discount and the 2% discount.

Intelligent pricing computing device 190 may analyze the customized pricing parameters that are generated for each freight shipment to determine whether each customized pricing parameter satisfies the integrated pricing package parameters that are applied to each freight shipment. In doing so, intelligent pricing computing device 190 may determine whether each customized pricing parameter is to be incorporated into the integrated pricing package for each shipment when the customized pricing parameters fail to satisfy the integrated pricing package threshold. Integrated pricing package parameters are parameters that when applied to the customized pricing parameters determine which customized pricing parameters should be incorporated into the integrated pricing package and which customized pricing parameters should be removed from the integrated pricing package such that the integrated pricing package that is offered to the freight client satisfies the integrated pricing package threshold.

For example, intelligent pricing computing device 190 may determine that an integrated pricing package includes the customized pricing parameters of a first discount and a second discount results in the integrated pricing package falling below the integrated pricing package threshold. Intelligent pricing computing device 190 may then apply an integrated pricing parameter of a first discount should be incorporated into the integrated pricing package while a second discount should not be incorporated into the integrated pricing package. Intelligent pricing computing device 190 may then generate integrated pricing package that includes the first discount but not the second discount such that the integrated pricing package satisfies the integrated pricing package threshold and results in the carrier achieving increased profitability in executed the transport request.

Intelligent pricing computing device 190 may integrate each customized pricing parameter that satisfies each integrated pricing package parameter for each freight shipment into the integrated pricing package for each corresponding freight client. Intelligent pricing computing device 190 may withhold each customized pricing parameter that fails to satisfy each integrated pricing parameter for each freight shipment from the integrated pricing package for each corresponding freight client. Intelligent pricing computing device 190 may provide each integrated pricing package to each freight client that incorporates the customized pricing parameters that satisfy each integrated pricing parameter for each freight shipment.

Thus, intelligent pricing computing device 190 may generate an integrated pricing package for each transport request that not only satisfies the shipment attributes and the behavioral attributes of the available transportation platform for the carrier but is also customized such that the integrated pricing package provides profitability for the carrier when executing the transport request. As noted above, the carrier may have numerous transportation platforms that are available with the availability constantly fluctuating and may have an immense amount of transport requests that may qualify to be transported by those numerous transportation platforms. Rather than the carrier having to evaluate each of the immense amount of integrated pricing packages to determine whether the integrated pricing packages would be profitable to the carrier if applied to the transport requests, intelligent pricing computing device 190 may further customize the integrated pricing packages to ensure that the integrated pricing packages are profitable for the carrier without any intervention by the carrier.

In an embodiment a shown in intelligent pricing system 500 in FIG. 5, each of the integrated pricing package parameters 550 may be applied to each of the customized pricing parameters to determine whether the customized pricing parameters satisfy the integrated pricing package threshold and should be included in the integrated pricing package. In an example embodiment, step 350 may be performed by processor 195 of intelligent pricing computing device 190 as shown in FIG. 1.

After the integrated pricing package parameters have been applied to the customized pricing parameters, in step 360, intelligent pricing computing device 360 may generate the integrated pricing package. As noted above, intelligent pricing computing device 190 may determine a current pricing package that exists between each freight client and the carrier. Intelligent pricing computing device 190 may then adjust the current pricing package by injecting the customized pricing parameters that are customized to each freight shipment based on the real-time update and analysis of the fluctuating carrier attributes into each current pricing package. In doing so, intelligent pricing computing device 190 may generate each integrated pricing package by adjusting each current pricing package to incorporate the customized pricing parameters. In an example embodiment, step 360 may be performed by processor 195 of intelligent pricing computing device 190 as shown in FIG. 1.

In step 370, intelligent pricing computing device 190 may determine whether the carrier identification for the integrated pricing package reconciles with the carrier. Intelligent pricing computing device 190 may generate a carrier identification for each integrated pricing package. The carrier identification is unique to the carrier that is transporting each freight shipment that is associated with each integrated pricing package. For example, the carrier identification may be a unique quote identification that is unique to the quote associated with the integrated pricing package for the transport request.

Intelligent pricing computing device 190 may determine whether the carrier identification for each integrated pricing package reconciles with the carrier. Intelligent pricing computing device 190 may apply each integrated pricing package to each freight shipment when the carrier identification for each integrated pricing package reconciles with the carrier. Intelligent pricing computing device 190 may apply the current pricking package that exists between each freight client and the carrier when the carrier identification for each pricing package fails to reconcile with the carrier.

In an embodiment as shown in intelligent pricing system 500 in FIG. 5, each carrier identification 560 may be applied to each integrated pricing package to determine whether the carrier identification reconciles with the carrier. In an example embodiment, step 360 may be performed by processor 195 of intelligent pricing computing device 190 as shown in FIG. 1.

In step 380, intelligent pricing computing device 190 may provide the integrated pricing package to the freight client. Intelligent pricing computing device 190 may provide each of the integrated pricing packages to each corresponding freight client computing device 140 such that each of the integrated pricing packages may be easily displayed to each of the freight clients via user interface 170. In an example embodiment, step 370 may be performed by processor 195 of intelligent pricing computing device 190 as shown in FIG. 1.

Intelligent pricing computing device 190 may continuously stream intelligent pricing data to intelligent pricing server 150 such that intelligent pricing server may accumulate intelligent pricing data as stored in carrier attribute database 185, carrier database 120, and/or freight client database 160. In doing so, intelligent pricing server may continuously accumulate intelligent pricing data that is associated the automatic adjustments of the rates generated by intelligent pricing computing device 190 based on the numerous shipment attributes, rate attributes, behavioral attributes, and/or shipper location attributes that intelligent pricing computing device 190 may incorporate into determining the rate for each of the numerous transport requests generated by each of the numerous freight clients. Over time as the plant data accumulated by intelligent pricing server 150 continues to increase, neural network 105 may then apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

Each time that intelligent pricing data is streamed to intelligent pricing server 140 neural network 105 may then assist intelligent pricing computing device 190 by providing intelligent pricing computing device 190 with the appropriate rate adjustments with regard to the appropriate shipment attributes, rate attributes, behavioral attributes, and/or shipper location attributes to automatically adjust the rate for the specific transport request as requested by the specific freight client based on the increased amount of intelligent pricing data stored in intelligent pricing server 140. Neural network 105 may assist intelligent pricing computing device 190 in learning as to the appropriate rate adjustments to execute based on the shipment attributes, rate attributes, behavioral attributes, and/or shipper location attributes that is associated with a specific transport request for a specific freight client such that neural network 105 may further improve the accuracy of intelligent pricing computing device 190 in automatically adjusting the rate for each transport request of each freight client to further enhance the rate applied to each transport request in real-time. Neural network 105 may provide intelligent pricing computing device 190 with improved accuracy in automatically adjusting the rates such that neural network 105 may continue to learn upon with the accumulation of intelligent pricing data that is provided by intelligent pricing computing device 195 and/or any computing device associated with intelligent pricing system 100 to intelligent pricing server 150. Thus, the profitability of the carrier may be further enhanced to ensure that the carrier incentivizes the appropriate freight clients to award the transport requests to the carrier when the carrier is to be impacted with a decrease cost when executing the transport requests while refraining from offering decreased rates for transport requests when the carrier is to be impacted with an increase cost when executing the transport requests.

Intelligent pricing server 150 includes a processor, a memory, and a network interface, herein after referred to as a computing device or simply "computer". For example, intelligent pricing server 150 may include a data information system, data management system, web server, and/or file transfer server. Intelligent pricing server 150 may also be a workstation, mobile device, computer, cluster of computers, set-top box, a cloud server or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A system for generating an integrated pricing package that incorporates attributes associated with a freight shipment that are updated and analyzed in real-time to provide a plurality of customized pricing parameters included in an integrated pricing package, comprising:

at least one processor; and a memory coupled with the at least one processor, the memory including instructions that, when executed by the at least one processor, cause the at least one processor to:

receive a plurality of requests from a plurality of freight clients to generate the integrated pricing package for each request;

continuously stream intelligent pricing data to a server as the intelligent pricing data continuously fluctuates as captured in a carrier database, a carrier database, and a freight client database;

automatically receive updated intelligent pricing data that is continuously trained on by a neural network based on machine learning as the neural network continuously updates the intelligent pricing data based on past intelligent pricing data generated from past freight shipments;

update in real-time a plurality of carrier attributes associated with a carrier that is transporting each freight shipment for each freight client, wherein the carrier attributes are associated with each different transportation platform provided by the carrier and fluctuate depending on an availability of each different transportation platform;

analyze in real-time the plurality of carrier attributes associated with the carrier to determine the carrier attributes that apply to each freight shipment requested by each freight client to transport by the carrier, wherein real-time is a current state of the plurality of carrier attributes as captured in the carrier attribute database, the carrier database, and the freight client database and streamed to the server;

continuously stream the plurality of carrier attributes as the carrier attributes continuously fluctuate depending on the availability of each different transportation platform as the carrier attributes are accumulated in the carrier database to the server;

generate the plurality of customized pricing parameters for each freight shipment by integrating the updated intelligent pricing data as received from the neural network with the carrier attributes that apply to each freight shipment, wherein the customized pricing parameters are customized to each freight shipment based on the real-time update and analysis of the fluctuating carrier attributes and the updated intelligent pricing data that apply to each freight shipment;

automatically receive a plurality of customized adjustments to the customized pricing parameters as generated by the neural network based on the continuous training of the neural network by machine learning that continuously updates the intelligent pricing data based on past intelligent pricing data generated from past freight shipments due to the continuous stream of intelligent pricing data in real-time to the server;

provide each integrated pricing package to each freight client that incorporates the customized pricing parameters that are customized to each freight shipment; and stream the intelligent pricing data included in the generated integrated pricing package to the server for the neural network to incorporate into the customized adjustments to additional customized pricing parameters for additional pricing packages as past pricing data.

2. The system of claim 1, wherein the plurality of attributes associated with the carrier that is transporting each freight shipment includes a plurality of shipment attributes that is associated with each of the different transport platforms provided by the carrier and a plurality of behavioral attributes that is associated with past behavior of each freight client engaging the carrier.

3. The system of claim 2, wherein the processor is further configured to:

update in real-time the plurality of shipment attributes associated with the carrier, wherein each of the shipment attributes provides a different constraint to determine whether a freight shipment qualifies for a corresponding integrated pricing package;

automatically apply in real-time each of the shipment attributes to each freight shipment as each freight shipment is requested by each freight client; and determine in real-time whether each freight shipment qualifies for the corresponding integrated pricing package based on whether each freight shipment satisfies each of the shipment attributes.

4. The system of claim 2, wherein the processor is further configured to:

update in real-time the plurality of behavioral attributes associated with the carrier so that the past behavior of each freight client engaging the carrier is up to date in real-time;

analyze in real-time the plurality of behavioral attributes to determine the plurality of customized parameters to be incorporated into the corresponding integrated pricing package for each freight client based on the past behavior between each freight client and the carrier; and provide each integrated pricing package to each freight client that incorporates the customized pricing parameters that are customized based on the past behavior between each freight client and the carrier.

5. The system of claim 1, wherein the processor is further configured to:

assess the plurality of customized pricing parameters that is generated for each corresponding freight shipment to determine whether the plurality of customized pricing parameters satisfy an integrated pricing package threshold for each freight shipment, wherein the integrated pricing package is prevented from decreasing below the integrated pricing package threshold.

6. The system of claim 5, wherein the processor is further configured to:

analyze the plurality of customized pricing parameters that is generated for each freight shipment to determine whether each customized pricing parameter satisfies a plurality of integrated pricing package parameters applied to each freight shipment to determine whether each customized pricing parameter is to be incorporated into the integrated pricing package for each freight shipment when the plurality of customized pricing parameters fail to satisfy the integrated pricing package threshold.

7. The system of claim 6, wherein the processor is further configured to:
   integrate each customized pricing parameter that satisfies each integrating pricing package parameter for each freight shipment into the integrated pricing package for each corresponding freight client;
   withhold each customized pricing parameter that fails to satisfy each integrated pricing parameter for each freight shipment from the integrated pricing package for each corresponding freight client; and
   provide each integrated pricing package to each freight client that incorporates the customized pricing parameters that satisfy each integrated pricing package parameter for each freight shipment.

8. The system of claim 1, wherein the processor is further configured to:
   generate a carrier identification for each integrated pricing package, wherein the carrier identification is unique to the carrier that is transporting each freight shipment that is associated with each integrated pricing package.

9. The system of claim 8, wherein the processor is further configured to:
   determine whether the carrier identification for each integrated pricing package reconciles with the carrier;
   apply each integrated pricing package to each freight shipment when the carrier identification for each integrated pricing package reconciles with the carrier; and
   apply a current pricing package that exists between each freight client and the carrier when the carrier identification for each pricing package fails to reconcile with the carrier.

10. A method for generating an integrated pricing package that incorporates attributes associated with a freight shipment that are updated and analyzed in real-time to provide a plurality of customized pricing parameters included in an integrated pricing package, comprising:
    receiving a plurality of requests from a plurality of freight clients to generate the integrated pricing package for each request;
    continuously streaming intelligent pricing data to a server as the intelligent pricing data continuously fluctuates as captured in a carrier attribute database, a carrier database, and a freight client database;
    automatically receiving updated intelligent pricing data that is continuously trained on by a neural network that is executed on a computing system comprising computing hardware, based on machine learning as the neural network continuously updates the intelligent pricing data based on past intelligent pricing data generated from past freight shipments;
    updating in real-time a plurality of carrier attributes associated with a carrier that is transporting each freight shipment for each freight client, wherein the carrier attributes are associated with each different transportation platform provided by the carrier and fluctuate depending on an availability of each different transportation platform;
    analyzing in real-time the plurality of carrier attributes associated with the carrier to determine the carrier attributes that apply to each freight shipment requested by each freight client to transport by the carrier, wherein real-time is a current state of the plurality of carrier attributes as captured in the carrier attribute database, the carrier database, and the freight client database and streamed to the server;
    continuously streaming the plurality of carrier attributes as the carrier attributes continuously fluctuate depending on the availability of each different transportation platform and as the carrier attributes are accumulated in the carrier attribute database to the server;
    generating the plurality of customized pricing parameters for each freight shipment by integrating the updated intelligent pricing data as received from the neural network with the carrier attributes that apply to each freight shipment, wherein the customized pricing parameters are customized to each freight shipment based on the real-time update and analysis of the fluctuating carrier attributes and the updated intelligent pricing data that apply to each freight shipment;
    automatically receiving a plurality of customized adjustments to the customized pricing parameters as generated by the neural network based on the continuous training of the neural network by machine learning that continuously updates the intelligent pricing data based on past intelligent pricing data generated from past freight shipments due to continuous streaming of intelligent pricing data in real-time to the server;
    providing each integrated pricing package to each freight client that incorporates the customized pricing parameters that are customized to each freight shipment; and
    streaming the intelligent pricing data included in the generated integrated pricing package to the server for the neural network to incorporate into the customized adjustments to additional customized pricing parameters for additional pricing packages as past intelligent pricing data.

11. The method of claim 10, wherein the plurality of attributes associated with the carrier that is transporting each freight shipment includes a plurality of shipment attributes that is associated with each of the different travel platforms provided by the carrier and a plurality of behavioral attributes that is associated with past behavior of each freight client engaging the carrier.

12. The method of claim 11, further comprising:
    updating in real-time the plurality of shipment attributes associated with the carrier, wherein each of the shipment attributes provides a different constraint to determine whether a freight shipment qualifies for a corresponding integrated pricing package;
    automatically applying in real-time each of the shipment attributes to each freight shipment as each freight shipment is requested by each freight client; and
    determining in real-time whether each freight shipment qualifies for the corresponding integrated pricing package based on whether each freight shipment satisfies each of the shipment attributes.

13. The method of claim 11, further comprising:
    updating in real-time the plurality of behavioral attributes associated with the carrier so that the past behavior of each freight client engaging the carrier is up to date in real-time;
    analyzing in real-time the plurality of behavioral attributes to determine the plurality of customized parameters to be incorporated into the corresponding integrated pricing package for each freight client based on the past behavior between each freight client and the carrier; and
    providing each integrated pricing package to each freight client that incorporates the customized pricing parameters that are customized based on the past behavior between each freight client and the carrier.

14. The method of claim 10, further comprising:
assessing the plurality of customized pricing parameters that is generated for each corresponding freight shipment to determine whether the plurality of customized pricing parameters satisfies an integrated pricing package threshold for each freight shipment, wherein the integrated pricing package is prevented from decreasing below the integrated pricing package threshold.

15. The method of claim 14, further comprising:
analyzing the plurality of customized pricing parameters that is generated for each freight shipment to determine whether each customized pricing parameter satisfies a plurality of integrated pricing package parameters applied to each freight shipment to determine whether each customized pricing parameter is to be incorporated into the integrated pricing package for each freight shipment when the plurality of customized pricing parameters fail to satisfy the integrated pricing package threshold.

16. The method of claim 15, further comprising:
integrating each customized pricing parameter that satisfies each integrated pricing package parameter for each freight shipment into the integrated pricing package for each corresponding freight client;
withholding each customized pricing parameter that fails to satisfy each integrated pricing parameter for each freight shipment from the integrated pricing package for each corresponding freight client; and
providing each integrated pricing package to each freight client that incorporates the customized pricing parameters that satisfy each integrated pricing package parameter for each freight shipment.

17. The method of claim 10, further comprising:
generating a carrier identification for each integrated pricing package, wherein the carrier identification is unique to the carrier that is transporting each freight shipment that is associated with each integrated pricing package.

18. The method of claim 17, further comprising:
determining whether the carrier identification for each integrated pricing package reconciles with the carrier;
applying each integrated pricing package to each freight shipment when the carrier identification for each integrated pricing package reconciles with the carrier; and
applying a current pricing package that exists between each freight client and the carrier when the carrier identification for each pricing package fails to reconcile with the carrier.

* * * * *